United States Patent
Kurihara et al.

(10) Patent No.: US 12,522,914 B2
(45) Date of Patent: Jan. 13, 2026

(54) FLOW RATE ADJUSTMENT VALVE, PUMP UNIT, AND SURFACE TREATMENT DEVICE

(71) Applicant: Shibaura Machine Co., Ltd., Chiyoda-ku (JP)

(72) Inventors: Yoshiaki Kurihara, Sunto-gun (JP); Takeshi Namba, Sunto-gun (JP); Satoshi Fukuyama, Numazu (JP); Koichi Nose, Osaka (JP)

(73) Assignee: Shibaura Machine Co., Ltd., Chiyoda-ku (JP)

( * ) Notice: Subject to any disclaimer, the term of this patent is extended or adjusted under 35 U.S.C. 154(b) by 630 days.

(21) Appl. No.: 17/760,569

(22) PCT Filed: Sep. 9, 2020

(86) PCT No.: PCT/JP2020/034202
§ 371 (c)(1),
(2) Date: Mar. 15, 2022

(87) PCT Pub. No.: WO2021/059989
PCT Pub. Date: Apr. 1, 2021

(65) Prior Publication Data
US 2022/0389565 A1    Dec. 8, 2022

(30) Foreign Application Priority Data
Sep. 25, 2019   (JP) ................. 2019-173645

(51) Int. Cl.
*C23C 14/54*   (2006.01)
*C23C 14/34*   (2006.01)

(52) U.S. Cl.
CPC .......... *C23C 14/54* (2013.01); *C23C 14/3492* (2013.01)

(58) Field of Classification Search
None
See application file for complete search history.

(56) References Cited

U.S. PATENT DOCUMENTS

| | | | |
|---|---|---|---|
| 5,611,863 A | | 3/1997 | Miyagi |
| 6,089,537 A | * | 7/2000 | Olmsted ................. F16K 51/02 |
| | | | 251/298 |

(Continued)

FOREIGN PATENT DOCUMENTS

| | | |
|---|---|---|
| CN | 1175088 A | 3/1998 |
| CN | 1643668 A | 7/2005 |

(Continued)

OTHER PUBLICATIONS

Combined Chinese Office Action and Search Report issued Oct. 31, 2023, in corresponding Chinese Patent Application No. 202080067355.6 (with English Translation and English Translation of Category of Cited Documents), 28 pages.

(Continued)

*Primary Examiner* — Jethro M. Pence
(74) *Attorney, Agent, or Firm* — Oblon, McClelland, Maier & Neustadt, L.L.P.

(57) ABSTRACT

A flow rate adjustment valve includes: a flow path portion which has one end at which an opening is formed, and in which a fluid flows; a lifting valve which is configured to close the opening by covering an entire region of the opening, open the opening by being separated from the opening in an opening direction of the opening, and change a distance from the opening in the opening direction to change a flow area with respect to the opening; and a servo actuator as a driver which moves the lifting valve in the opening direction based on a predetermined detection value.

6 Claims, 28 Drawing Sheets

(56) References Cited

U.S. PATENT DOCUMENTS

| | | | |
|---|---|---|---|
| 8,783,652 B2* | 7/2014 | Dinh | F16K 31/1221 |
| | | | 137/486 |
| 10,337,105 B2* | 7/2019 | Hill | H01J 37/32844 |
| 10,704,715 B2* | 7/2020 | Takeda | F04D 29/524 |
| 2007/0289533 A1 | 12/2007 | Horiguchi | |
| 2016/0372347 A1 | 12/2016 | Kim et al. | |
| 2018/0233327 A1 | 8/2018 | Kalnin et al. | |
| 2019/0090341 A1 | 3/2019 | Takahashi et al. | |

FOREIGN PATENT DOCUMENTS

| | | |
|---|---|---|
| CN | 206338415 U | 7/2017 |
| CN | 108431923 A | 8/2018 |
| CN | 108930656 A | 12/2018 |
| DE | 31 09 002 A1 | 10/1982 |
| DE | 10 2015 121 252 A1 | 6/2017 |
| EP | 0 389 284 A2 | 9/1990 |
| EP | 1 063 457 A2 | 12/2000 |
| JP | 8-64578 A | 3/1996 |
| JP | 2002-246373 A | 8/2002 |
| JP | 2007-211696 A | 8/2007 |
| JP | 2011-157989 A | 8/2011 |
| JP | 2013-210095 A | 10/2013 |
| JP | 2015-170267 A | 9/2015 |
| JP | WO 2017/159838 A1 | 9/2017 |
| JP | 2019-124194 A | 7/2019 |

OTHER PUBLICATIONS

Chun-Mei Fung et. al., "3D Print Forming Process and Technology", Nanjing Normal University Press, May 2016, First Edition, pp. 148-151, with English Translation.

Office Action issued Oct. 22, 2024, in corresponding Japanese Patent Application No. 2021-548780 (with English Translation), 7 pages.

Combined Chinese Office Action and Search Report issued on Apr. 12, 2023 (with English translation), 18 pages.

International Search Report issued Dec. 1, 2020 in PCT/JP2020/034202 filed Sep. 9, 2020, 2 pages.

Combined Chinese Office Action and Search Report issued on Feb. 27, 2024 in Chinese Patent Application No. 202080067355.6 (with unedited computer-generated English translation), 10 pages.

Japanese Office Action issued on Jan. 7, 2025 in Japanese Patent Application No. 2021-548780 (with unedited computer-generated English translation), 5 pages.

* cited by examiner

FLOW RATE ADJUSTMENT VALVE, PUMP UNIT, AND SURFACE TREATMENT DEVICE

CROSS-REFERENCE TO RELATED APPLICATIONS

This application is a national stage application of International Application No. PCT/JP2020/034202, filed Sep. 9, 2020, which designates the United States, incorporated herein by reference, and which claims the benefit of priority from Japanese Patent Application No. 2019-173645, filed Sep. 25, 2019, the entire contents of which are incorporated herein by reference.

TECHNICAL FIELD

The present invention relates to a flow rate adjustment valve that adjusts a flow rate of a fluid, a pump unit, and a surface treatment device.

BACKGROUND ART

Some conventional surface treatment devices perform cleaning and modification using plasma, formation of a thin metal catalyst layer, surface treatment of a functional group or the like, and sputtering using a sputtering device on a workpiece. For example, Patent Document 1 discloses a plasma generation device, in which the plasma generation device and a sputtering device are disposed in one chamber, and a workpiece is moved in the chamber for each process, or the plasma generation device and the sputtering device are disposed in different chambers, and the workpiece is moved between the chambers for each process.

A surface treatment device such as the plasma generation device described in Patent Document 1 includes a vacuum pump such as a turbo molecular pump in order to perform surface treatment in a vacuum atmosphere, and a flow rate adjustment valve for adjusting a flow rate of a fluid is disposed between a vacuum treatment chamber for performing surface treatment and the vacuum pump. A conventional flow rate adjustment valve disposed between the vacuum treatment chamber and the vacuum pump can adjust a pressure in the vacuum treatment chamber by adjusting the area of an opening of a passage between the vacuum treatment chamber and the vacuum pump.

For example, in a semiconductor manufacturing device described in Patent Document 2, a butterfly valve is disposed between a vacuum treatment chamber and a turbo molecular pump. The butterfly valve can adjust a flow rate of a fluid flowing from the vacuum treatment chamber to the turbo molecular pump by rotating a disk used as a valve around a support shaft orthogonal to an axial direction of a flow path, in the flow path between the vacuum treatment chamber and the turbo molecular pump. In a vacuum valve described in Patent Document 3, a valve plate capable of adjusting the area of an opening of a flow path between a vacuum chamber and a turbo molecular pump is disposed between the vacuum chamber and the turbo molecular pump. In the vacuum valve, a flow rate of a fluid flowing from the vacuum chamber to the turbo molecular pump can be adjusted by moving the valve plate in a direction intersecting a direction of the flow path between the vacuum chamber and the turbo molecular pump.

CITATION LIST

Patent Literature

Patent Document 1: WO 2017/159838 A
Patent Document 2: JP H8-64578 A
Patent Document 3: JP 2019-124194 A

SUMMARY OF INVENTION

Problem to be Solved by the Invention

However, in a case where the area of an opening of a flow path is adjusted by rotating a disk used as a valve such as a butterfly valve in the flow path or by moving a valve plate in a direction intersecting a direction of the flow path, the amount of change in area of the opening is not proportional to an operation amount of the valve, and thus it is difficult to adjust the area of the opening with high accuracy. In this case, it may be difficult to adjust a flow rate of a fluid flowing through the flow path with high accuracy, and there is room for improvement from the viewpoint of accuracy in adjusting the flow rate.

The present invention has been made in view of the above, and it is an object to provide a flow rate adjustment valve capable of adjusting a flow rate of a fluid with high accuracy, a pump unit, and a surface treatment device.

Means for Solving Problem

In order to solve the above problem and achieve the object, a flow rate adjustment valve according to the present invention includes: a flow path portion which has one end at which an opening is formed, and in which a fluid flows; a lifting valve which is configured to cover an entire region of the opening to close the opening, be separated from the opening in an opening direction of the opening to open the opening, and change a distance from the opening in the opening direction to change a flow area with respect to the opening; and a driving means which moves the lifting valve in the opening direction based on a predetermined detection value.

Further, in order to solve the above problem and achieve the object, a pump unit according to the present invention includes: a flow rate adjustment valve which includes a flow path portion which has one end at which an opening is formed, and in which a fluid flows, a lifting valve which is configured to cover an entire region of the opening to close the opening, be separated from the opening in an opening direction of the opening to open the opening, and change a distance from the opening in the opening direction to change a flow area with respect to the opening, and a driving means which moves the lifting valve in the opening direction based on a predetermined detection value; and a pump which is disposed opposite to the end portion where the opening is formed in the flow path portion, and sucks the fluid flowing in the flow path portion.

Furthermore, in order to solve the above problem and achieve the object, a surface treatment device includes: a flow rate adjustment valve which includes a flow path portion which has one end at which an opening is formed, and in which a fluid flows, a lifting valve which is configured to cover an entire region of the opening to close the opening, be separated from the opening in an opening direction of the opening to open the opening, and change a distance from the opening in the opening direction to change a flow area with respect to the opening, and a driving means which moves the lifting valve in the opening direction based on a predetermined detection value; a pump which is disposed opposite to the end portion where the opening is formed in the flow path portion, and sucks the fluid flowing in the flow path portion; and a chamber which is configured to house a workpiece to be subjected to surface treatment therein, wherein the opening is opened with respect to the chamber, the lifting valve is disposed in the chamber, and the driving means moves the lifting valve based on a pressure in the chamber.

Effect of the Invention

The flow rate adjustment valve, the pump unit, and the surface treatment device according to the present invention have an effect that a flow rate of a fluid can be adjusted with high accuracy.

DESCRIPTION OF EMBODIMENTS

Hereinafter, exemplary embodiments of a flow rate adjustment valve, a pump unit, and a surface treatment device according to the present disclosure will be described in detail with reference to the drawings. Note that the present invention is not limited by the embodiments. In addition, constituent elements in the following embodiments include those that can be replaced and can be easily conceived by those skilled in the art, or those that are substantially the same.

EMBODIMENT

Figure 1:
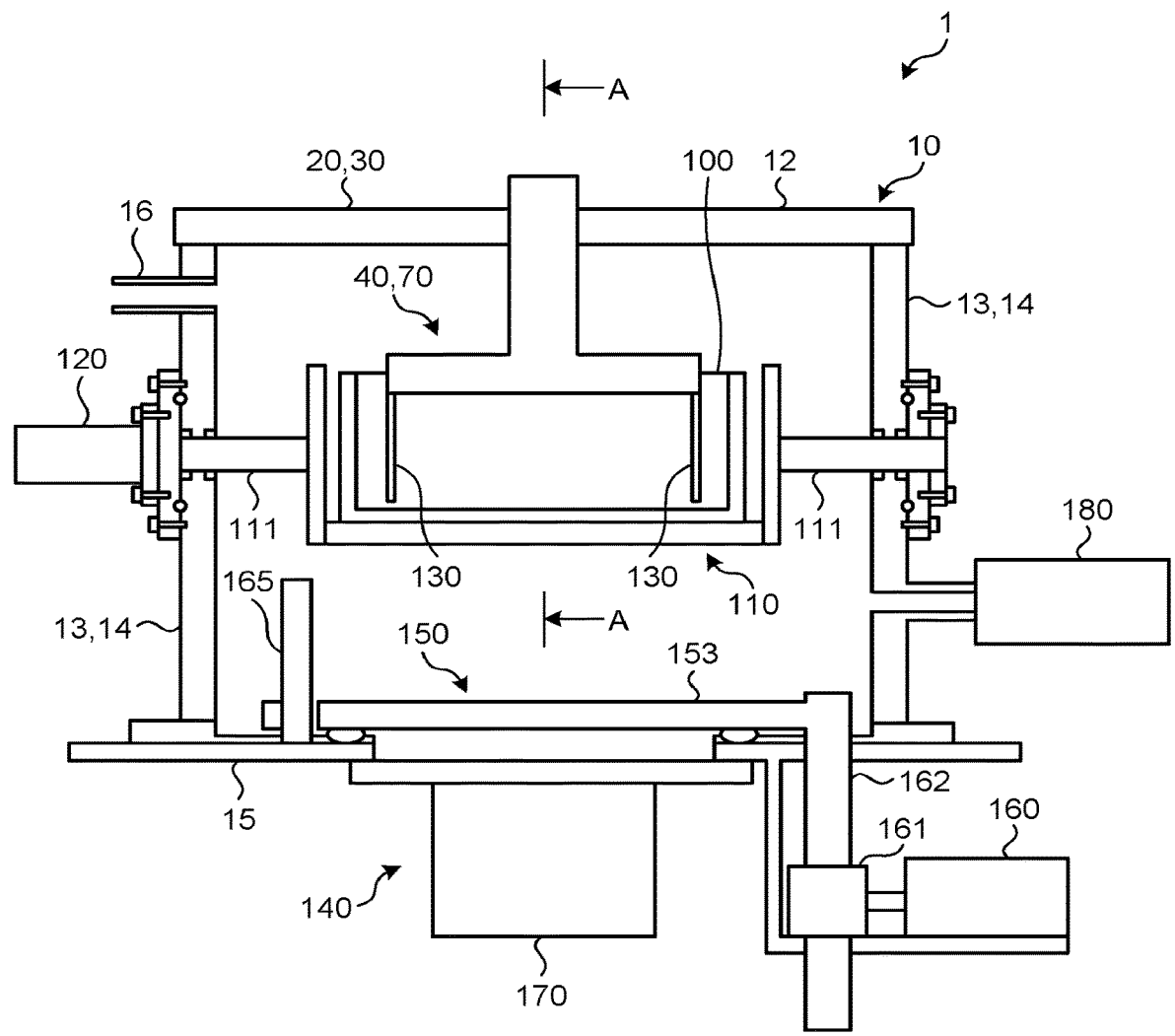
FIG. 1 is a schematic view illustrating a device configuration of a surface treatment device according to an embodiment.
Figure 1:
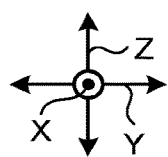
Figure 2:
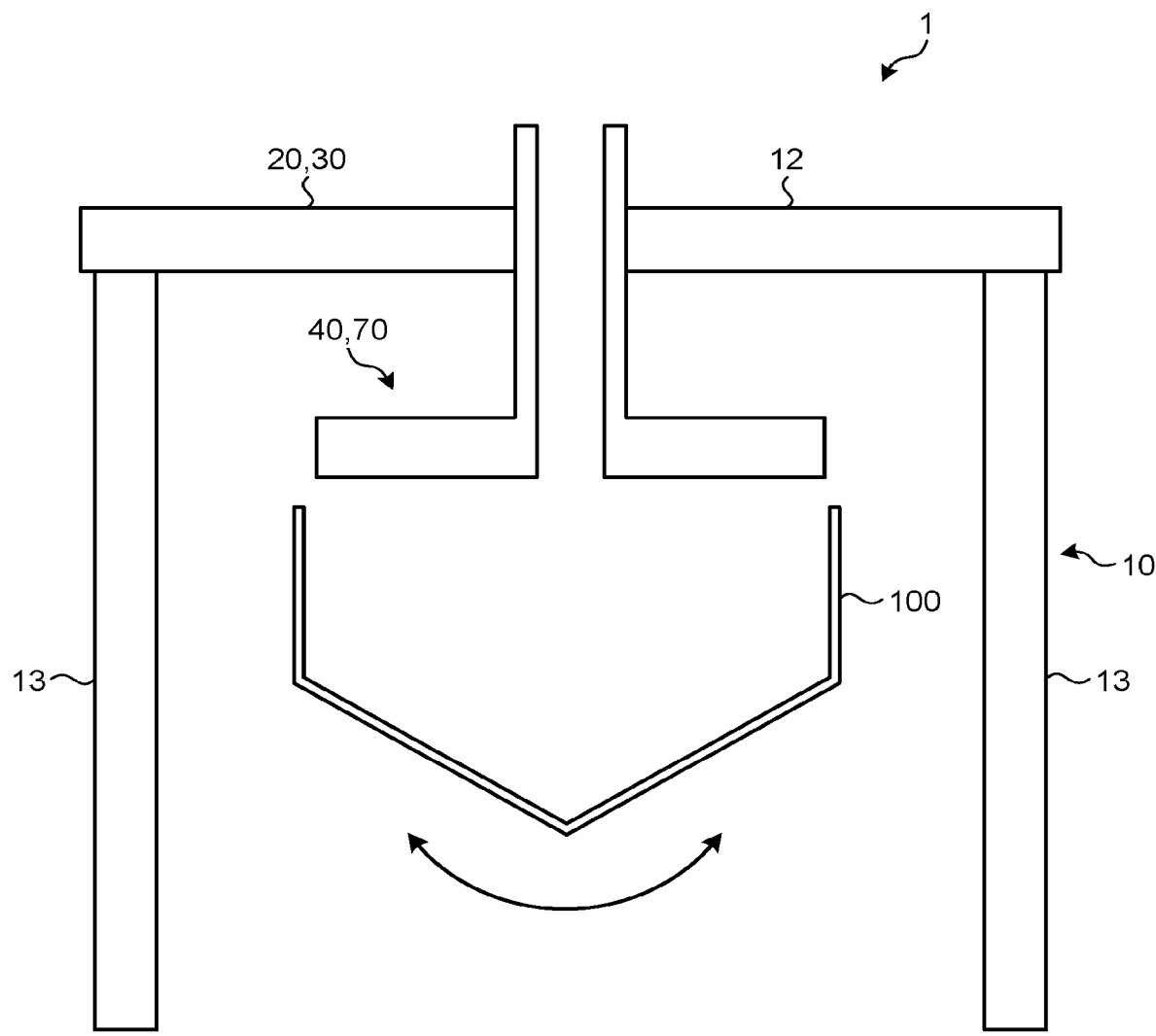
FIG. 2 is a schematic cross-sectional view taken along line A-A of FIG. 1.
Figure 2:
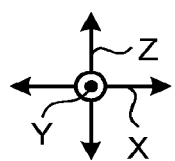

FIG. 1 is a schematic view illustrating a device configuration of a surface treatment device 1 according to an embodiment. FIG. 2 is a schematic cross-sectional view taken along line A-A of FIG. 1. Note that, in the following description, the vertical direction in a normal use state of the surface treatment device 1 will be described as a vertical direction Z in the surface treatment device 1, the upper side in the normal use state of the surface treatment device 1 will be described as an upper side in the surface treatment device 1, and the lower side in the normal use state of the surface treatment device 1 will be described as a lower side in the surface treatment device 1. In addition, a horizontal direction in the normal use state of the surface treatment device 1 will be described as a horizontal direction also in the surface treatment device 1. Furthermore, in the horizontal direction, an extending direction of a swing shaft 111 of a housing unit support member 110 described later will be described as a length direction Y in the surface treatment device 1, and a direction orthogonal to both a height direction and the length direction of the surface treatment device 1 will be described as a width direction X in the surface treatment device 1.

<Overall Configuration of Surface Treatment Device 1>

The surface treatment device 1 according to the present embodiment includes a chamber 10 formed so as to be able to house a workpiece W (see FIG. 21) therein, a plasma generation device 40 as a first treatment device that performs surface treatment on the workpiece W, a sputtering device 70 as a second treatment device that performs surface treatment different from that of the first treatment device on the workpiece W, a housing unit 100 that houses the workpiece W, and a pump unit 140 that reduces a pressure in the chamber 10. Among them, the plasma generation device 40 can generate plasma to perform surface treatment on the workpiece W, and the sputtering device 70 can perform sputtering to perform surface treatment on the workpiece W. Further, the plasma generation device 40 and the sputtering device 70 can be switched to be disposed in the chamber 10.

Note that FIGS. 1 and 2 are schematic views illustrating a positional relationship in the chamber 10 in a case where the plasma generation device 40 or the sputtering device 70 is positioned in the chamber 10, and thus, can be applied regardless of whether the device positioned in the chamber 10 is the plasma generation device 40 or the sputtering device 70. The chamber 10 is formed in a hollow substantially rectangular parallelepiped shape, and the plasma generation device 40 and the sputtering device 70 are attached to an upper wall 12 which is an upper wall surface and are disposed in the chamber 10. In the chamber 10, a gas inflow portion 16 through which gas used for performing sputtering by the sputtering device 70 flows into the chamber 10 is disposed in a side wall 13 of the chamber 10. For example, a path of the gas used when the sputtering device 70 performs sputtering using argon, nitrogen, oxygen, or the like is connected to the gas inflow portion 16, and the gas flowing into the chamber 10 can flow into the gas inflow portion 16.

The housing unit 100 is supported by the housing unit support member 110 and is provided in the chamber 10, such that the chamber 10 can house the workpiece W therein. The housing unit support member 110 is connected to support walls 14 which are a set of side walls 13 facing each other among a plurality of side walls 13 constituting the chamber 10, and is supported by the support walls 14.

The housing unit 100 supported by the housing unit support member 110 is supported by the support walls 14 via the housing unit support member 110. The housing unit support member 110 can swing around the swing shafts 111 extending in the horizontal direction toward both of the support walls 14 facing each other. That is, a servomotor 120, which is a swinging means for swinging the housing unit 100, is attached to the chamber 10, and the housing unit support member 110 can swing by a driving force transmitted from the servomotor 120. When the housing unit support member 110 swings, the housing unit 100 supported by the housing unit support member 110 can swing integrally with the housing unit support member 110 around the swing shafts 111.

The pump unit 140 is attached to a bottom portion 15 of the chamber 10, and specifically, is disposed near the center of the bottom portion 15 of the chamber 10 in each of the length direction Y and the width direction X. Thus, the pump unit 140 is disposed immediately under the housing unit 100 provided in the chamber 10. The pump unit 140 disposed on the bottom portion 15 of the chamber 10 as described above can reduce the pressure in the chamber 10 by sucking a fluid in the chamber 10, that is, the gas in the chamber 10.

The pump unit 140 according to the present embodiment includes a flow rate adjustment valve 150, which is a valve unit for adjusting the flow rate of the fluid, and a turbo molecular pump 170, which is a pump for sucking the fluid, and the flow rate adjustment valve 150 can adjust the flow rate of the fluid sucked by the turbo molecular pump 170 to reduce the pressure in the chamber 10 to a desired pressure.

The flow rate adjustment valve 150 includes a lifting valve 153 disposed in the chamber 10, and a servo actuator 160 which is a driving means for moving the lifting valve 153 in the vertical direction Z in the chamber 10. The lifting valve 153 can move in the vertical direction Z in the chamber 10 to adjust the flow rate of the fluid sucked by the turbo molecular pump 170.

The flow rate adjustment valve 150 includes a lifting shaft 162 to which the lifting valve 153 is connected, and a worm jack 161 that transmits a driving force generated by the servo actuator 160 to the lifting shaft 162 to move the lifting shaft 162 in the vertical direction Z. A vacuum gauge 180 is attached to the chamber 10, and the pressure in the chamber 10 can be detected by the vacuum gauge 180. The servo actuator 160 can be operated based on a detection value detected by the vacuum gauge 180, thereby moving the lifting valve 153 in the vertical direction Z based on the detection value detected by the vacuum gauge 180 to adjust the flow rate of the fluid sucked by the turbo molecular pump 170.

<Structure for Switching between Plasma Generation Device 40 and Sputtering Device 70>

Figure 3:
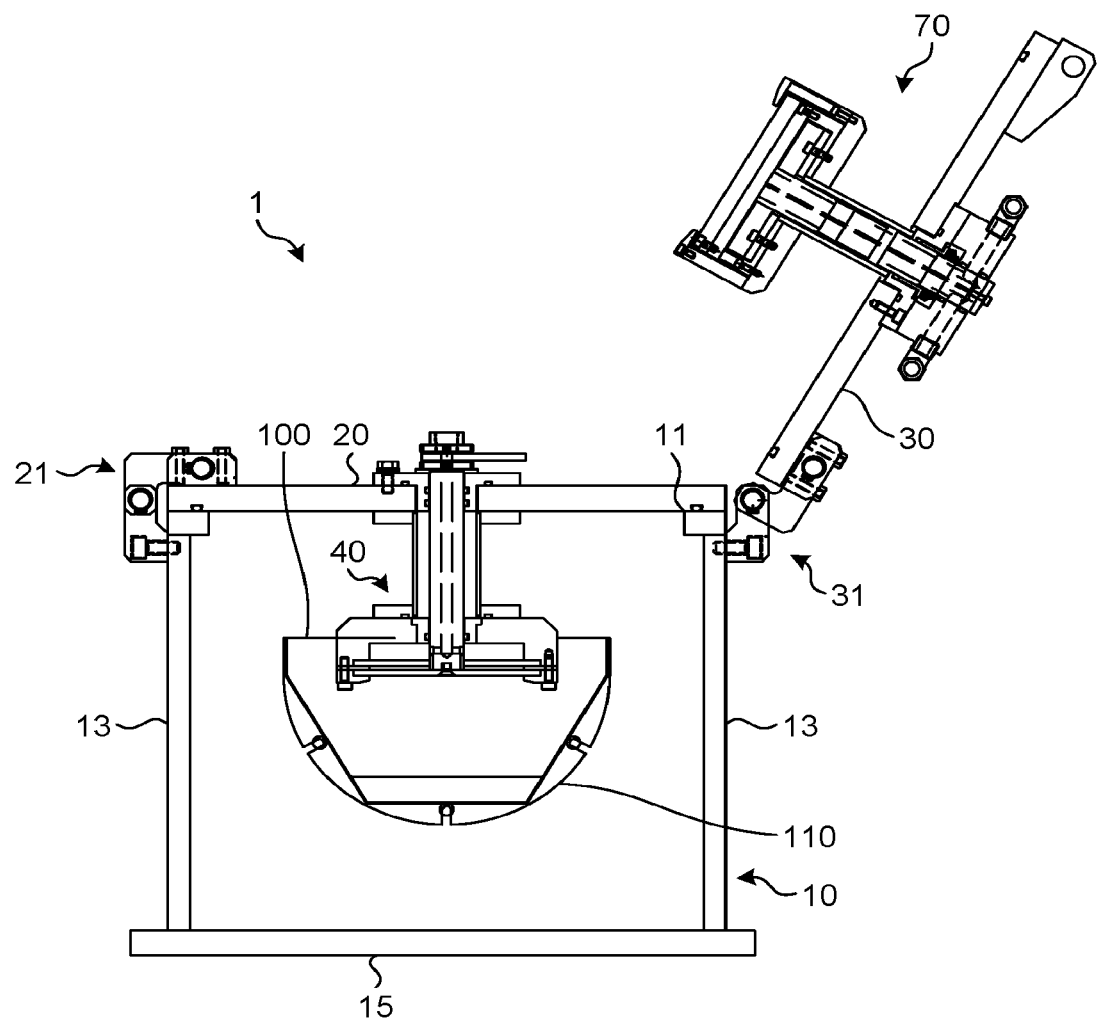
FIG. 3 is an explanatory diagram illustrating switching between a plasma generation device and a sputtering device to be positioned in a chamber, and is an explanatory diagram illustrating a state in which the plasma generation device is positioned in the chamber.
Figure 4:
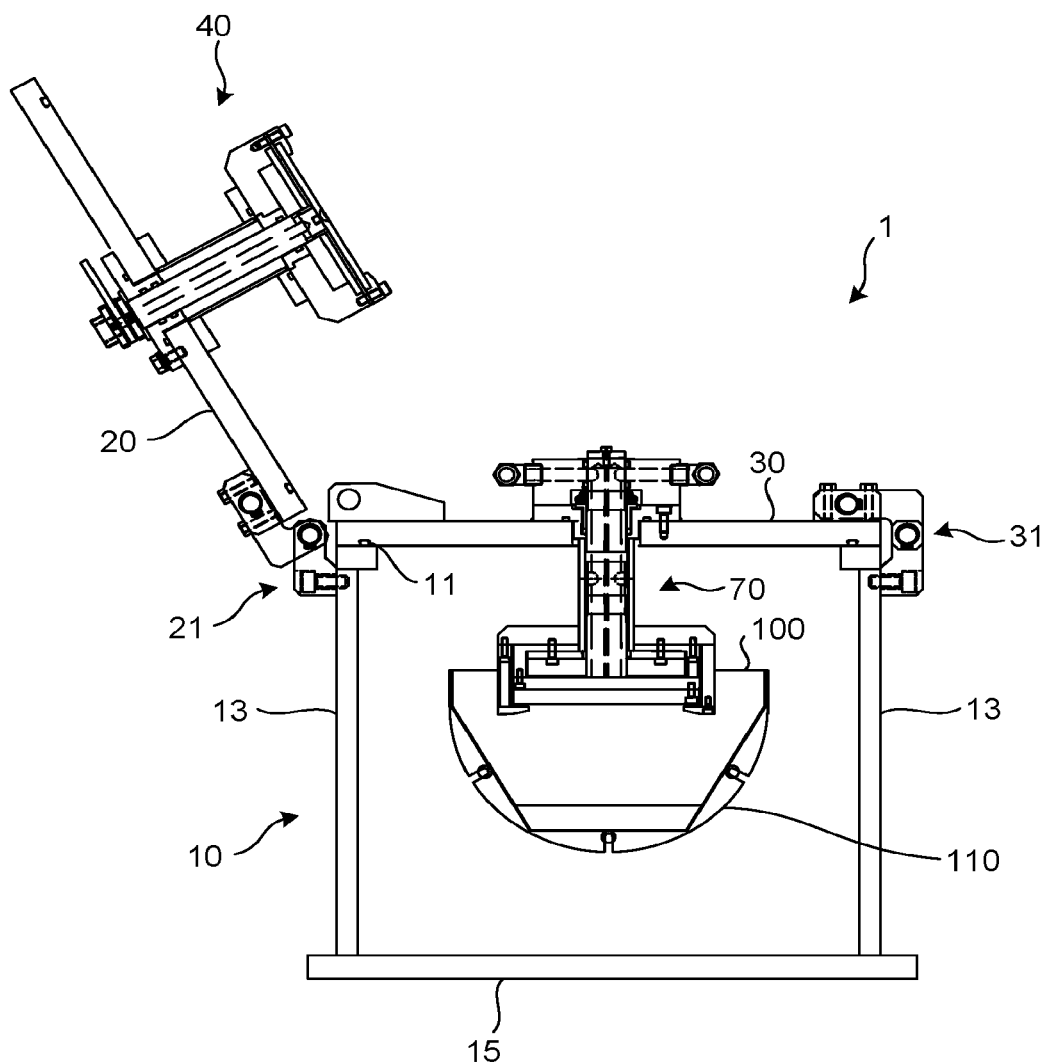
FIG. 4 is an explanatory diagram illustrating switching between the plasma generation device and the sputtering device to be positioned in the chamber, and is an explanatory diagram illustrating a state in which the sputtering device is positioned in the chamber.
Figure 4:
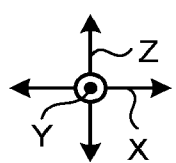

FIGS. 3 and 4 are explanatory diagrams illustrating switching between the plasma generation device 40 and the sputtering device 70 to be positioned in the chamber 10, and FIG. 3 is an explanatory diagram illustrating a state in which the plasma generation device 40 is positioned in the chamber 10. FIG. 4 is an explanatory diagram illustrating a state in which the sputtering device 70 is positioned in the chamber 10. The chamber 10 has an opening 11 formed on the upper side of the chamber 10, and the plasma generation device 40 and the sputtering device 70 can be switched to be inserted into the chamber 10 through the opening 11 and be positioned in the chamber 10. Specifically, the plasma generation device 40 is disposed on a first opening/closing member 20 attached to the chamber 10 so as to open and close the opening 11, and the sputtering device 70 is disposed on a second opening/closing member 30 attached to the chamber 10 so as to open and close the opening 11.

Both the first opening/closing member 20 and the second opening/closing member 30 have a substantially rectangular shape in plan view, and have the same shape as an outer peripheral shape formed by the plurality of side walls 13 when the chamber 10 is projected in the vertical direction Z. Therefore, the first opening/closing member 20 and the second opening/closing member 30 have a shape capable of covering the opening 11 of the chamber 10, that is, the first opening/closing member 20 and the second opening/closing member 30 can cover the opening 11 of the chamber 10 to close the opening 11. The first opening/closing member 20 and the second opening/closing member 30 are rotatably attached to the chamber 10, such that the first opening/closing member 20 and the second opening/closing member 30 rotate with respect to the chamber 10 to open and close the opening 11.

Specifically, in the first opening/closing member 20, one side of the rectangle and one side wall 13 of the chamber 10 are connected by a hinge portion 21. The hinge portion 21 connects the first opening/closing member 20 to the chamber 10 so as to be rotatable around a rotation shaft extending in the horizontal direction. The first opening/closing member 20 can rotate around the hinge portion 21 so that a position of the first opening/closing member 20 is switched between a position in a state of covering the opening 11 of the chamber 10 and closing the opening 11 and a position in a state of bouncing up above the opening 11 and opening the opening 11. The plasma generation device 40 penetrates through the first opening/closing member 20 in a thickness direction of the first opening/closing member 20 and is attached to the first opening/closing member 20. In addition, the plasma generation device 40 is attached to the first opening/closing member 20 so that a portion for generating plasma in the plasma generation device 40 is positioned in the chamber 10 when the first opening/closing member 20 rotatably connected to the chamber 10 is closed.

In the second opening/closing member 30, one side of the rectangle and the side wall 13 facing the side wall 13 to which the first opening/closing member 20 is connected among the plurality of side walls 13 of the chamber 10 are connected by a hinge portion 31. The hinge portion 31 connects the second opening/closing member 30 to the chamber 10 so as to be rotatable around a rotation shaft extending in the horizontal direction. The second opening/closing member 30 can rotate around the hinge portion 31 so that a position of the second opening/closing member 30 is switched between a position in a state of covering the opening 11 of the chamber 10 and closing the opening 11 and a position in a state of bouncing up above the opening 11 and opening the opening 11. The sputtering device 70 penetrates through the second opening/closing member 30 in the thickness direction of the second opening/closing member 30 and is attached to the second opening/closing member 30. In addition, the sputtering device 70 is attached to the second opening/closing member 30 so that a portion for performing sputtering in the sputtering device 70 is positioned in the chamber 10 when the second opening/closing member 30 rotatably connected to the chamber 10 is closed.

When the opening 11 of the chamber 10 is closed, one of the first opening/closing member 20 and the second opening/closing member 30 is closed and the other is opened. That is, the first opening/closing member 20 or the second opening/closing member 30 can close the opening 11 of the chamber 10 in a state in which the other does not close the opening 11. Therefore, the first opening/closing member 20 closes the opening 11 in a state in which the second opening/closing member 30 does not close the opening 11, such that the portion for generating plasma in the plasma generation device 40 can be positioned in the chamber 10 (see FIG. 3). Similarly, the second opening/closing member 30 closes the opening 11 in a state in which the first opening/closing member 20 does not close the opening 11, such that the portion for performing sputtering in the sputtering device 70 can be positioned in the chamber 10 (see FIG. 4).

<Plasma Generation Device 40>

Figure 5:
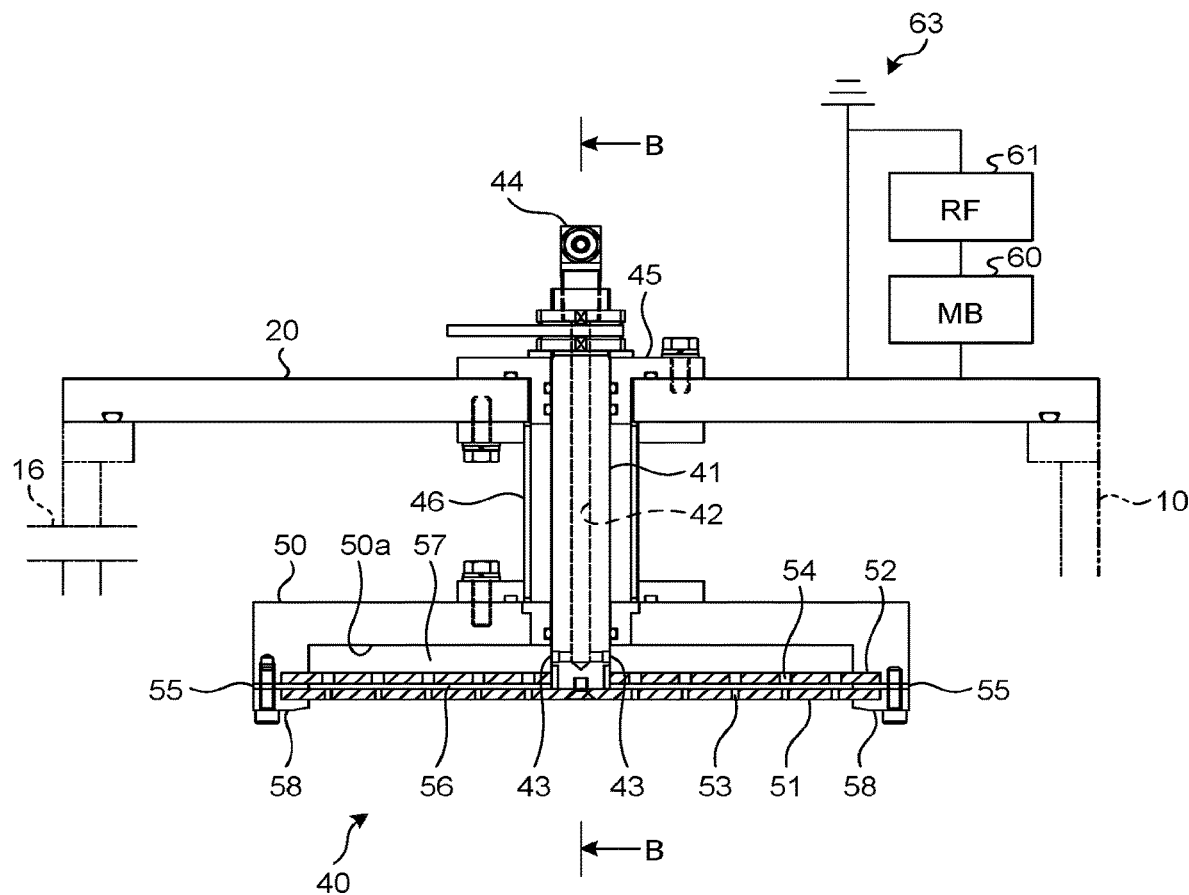
FIG. 5 is a detailed view of the plasma generation device illustrated in FIG. 3.
Figure 6:
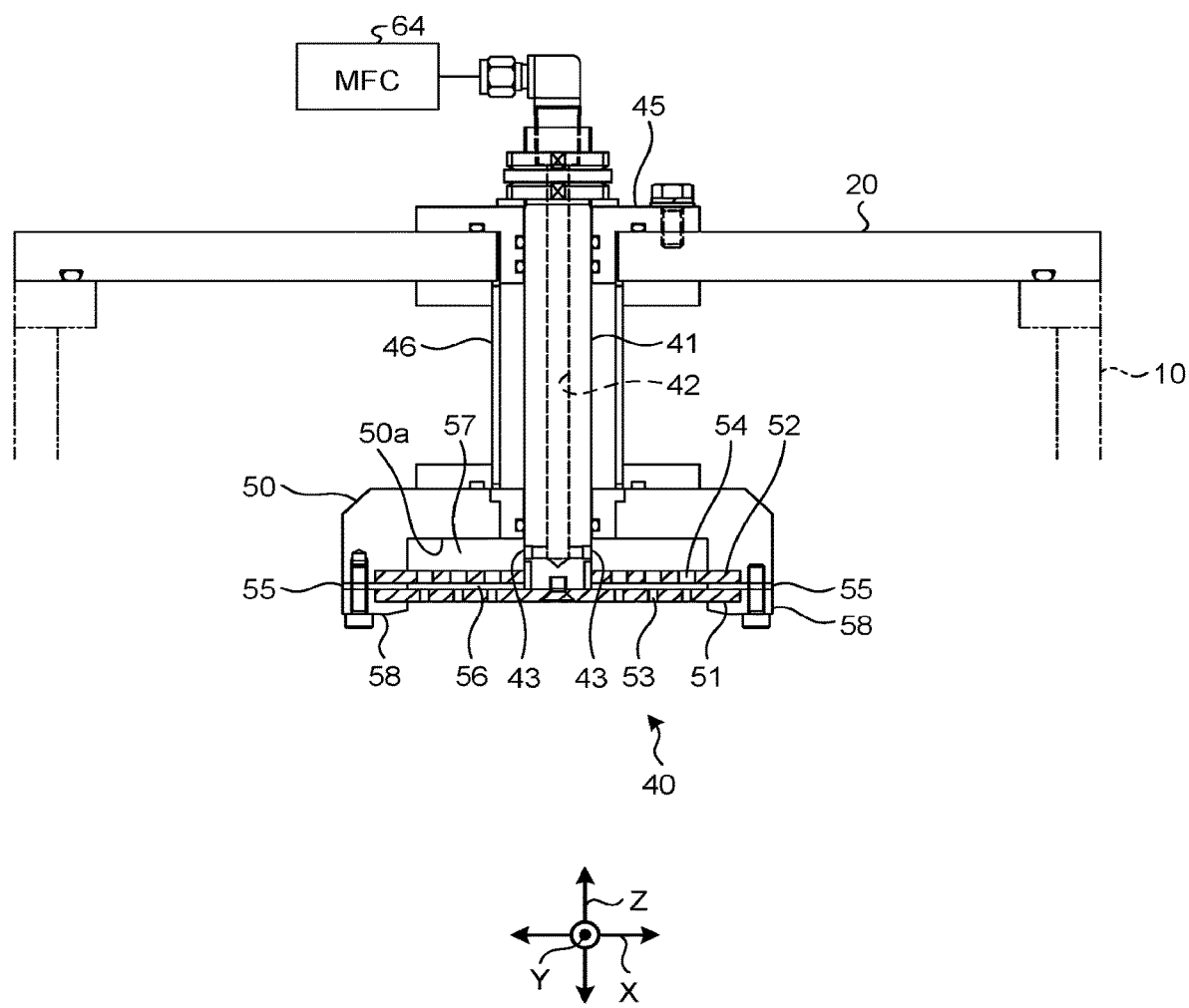
FIG. 6 is a cross-sectional view taken along line B-B of FIG. 5.

FIG. 5 is a detailed view of the plasma generation device 40 illustrated in FIG. 3. FIG. 6 is a cross-sectional view taken along line B-B of FIG. 5. The plasma generation device 40 includes a gas supply pipe 41 that supplies gas used when generating plasma, and a pair of plate-shaped conductor portions 51 and 52 that generate plasma from the gas supplied from the gas supply pipe 41 by a high-frequency voltage. Specifically, the gas supply pipe 41 penetrates through the first opening/closing member 20 in the thickness direction of the first opening/closing member 20, and is attached to the first opening/closing member 20 by a gas supply pipe attachment member 45. A gas flow path 42 extending in an extending direction of the gas supply pipe 41 is formed in the gas supply pipe 41, and the gas can be supplied from the outside of the chamber 10 into the chamber 10. That is, a gas supply portion 44 that supplies the gas used when generating plasma to the gas supply pipe 41 is connected to an end portion of the gas supply pipe 41 on the side positioned outside when the first opening/closing member 20 closes the opening 11 of the chamber 10, and a gas supply hole 43 that is a hole for introducing the gas flowing through the gas flow path 42 into the chamber 10 is formed at a position near the other end of the gas supply pipe 41. Plasma generation gas, which is gas used for generating plasma, is supplied to the gas supply portion 44 via a mass flow controller (MFC) 64 in which a mass flowmeter has a flow rate control function. As the plasma generation gas, for example, argon, mixed gas of argon and oxygen, single gas of oxygen or nitrogen, mixed gas of oxygen or nitrogen and ammonia, or the like is used. Furthermore, helium, carbon dioxide, nitrous oxide, hydrogen, air, and mixed gas thereof may be used as the plasma generation gas.

Each of the pair of plate-shaped conductor portions 51 and 52 is formed in a flat plate shape, and is formed of a metal plate such as aluminum or another conductor plate. Note that the plate-shaped conductor portions 51 and 52 may have a dielectric film on surfaces thereof, may have a configuration in which the surfaces of the pair of plate-shaped conductor portions 51 and 52 on the side where plasma gas is led out may be covered with the dielectric film by alumina spraying or hard anodizing in order to avoid arc discharge or the like, or may have a configuration in which both surfaces of each of the plate-shaped conductor portions 51 and 52 are subjected to alumina spraying or hard anodizing.

The pair of plate-shaped conductor portions 51 and 52 are supported by a support plate 50. The support plate 50 is formed of, for example, an insulating material such as glass or ceramic. The support plate 50 is formed in a shape in which a protruding portion is formed over an entire periphery near an outer periphery on one surface side of the plate, in other words, the support plate 50 is formed in a thick plate-like shape in which a recess portion 50a recessed along the outer periphery of the support plate 50 is formed on one surface side.

The support plate 50 formed in this manner is supported by a support member 46 so that a surface on the side where the recess portion 50a is not formed faces the first opening/closing member 20, and a surface on the side where the recess portion 50a is formed is positioned opposite to the side where the first opening/closing member 20 is positioned. The support member 46 includes a cylindrical member and attachment members positioned at both ends of the cylindrical member. The attachment member on one end side is attached to the first opening/closing member 20, and the attachment member on the other end side is attached to the support plate 50. Therefore, the support plate 50 is supported by the support member 46 disposed between and attached to the support plate 50 and the first opening/closing member 20.

The gas supply pipe 41 penetrating through the first opening/closing member 20 passes through the inside of the cylindrical member in the support member 46, extends toward the support plate 50, and penetrates through the support plate 50. As a result, the gas supply hole 43 formed in the gas supply pipe 41 is disposed in a portion where the recess portion 50a is formed in the support plate 50.

The pair of plate-shaped conductor portions 51 and 52 are disposed on the side of the support plate 50 where the recess portion 50a is formed so as to cover the recess portion 50a. At this time, a spacer 55 is disposed in the vicinity of the outer periphery between the pair of plate-shaped conductor portions 51 and 52, and the pair of plate-shaped conductor portions 51 and 52 overlap each other with the spacer 55 interposed therebetween. As described above, in the pair of plate-shaped conductor portions 51 and 52 overlapping each other with the spacer 55 interposed therebetween, the plate-shaped conductor portion 51 and the plate-shaped conductor portion 52 are separated from each other at a portion other than a portion where the spacer 55 is disposed, and the portion is formed as a gap portion 56. An interval between the pair of plate-shaped conductor portions 51 and 52 is preferably appropriately set according to gas to be introduced into the plasma generation device 40, a frequency of power to be supplied, the size of an electrode, and the like, and is, for example, about 3 mm to 12 mm.

The pair of plate-shaped conductor portions 51 and 52 are held by holding members 58, which are members for holding the plate-shaped conductor portions 51 and 52 in a state where the plate-shaped conductor portions 51 and 52 overlap each other with the spacer 55 interposed therebetween. That is, the holding members 58 are disposed on the side of the plate-shaped conductor portions 51 and 52 opposite to the side where the support plate 50 is positioned, and are attached to the support plate 50 in a state in which the plate-shaped conductor portions 51 and 52 are sandwiched between the holding members 58 and the support plate 50. As a result, the pair of plate-shaped conductor portions 51 and 52 overlapping each other with the spacer 55 interposed therebetween are held by the holding members 58 in a state of being sandwiched between the holding members 58 and the support plate 50.

The pair of plate-shaped conductor portions 51 and 52 are disposed so as to cover the recess portion 50*a* in the support plate 50, and in a state in which the pair of plate-shaped conductor portions 51 and 52 are held by the holding members 58, the recess portion 50*a* of the support plate 50 and the plate-shaped conductor portions 51 and 52 form a space.

For example, in a case where the plate-shaped conductor portion 52 is disposed on the support plate 50 side and the plate-shaped conductor portion 51 is disposed on the holding member 58 side among the pair of plate-shaped conductor portions 51 and 52 disposed in an overlapping manner, this space is defined by the recess portion 50*a* of the support plate 50 and the plate-shaped conductor portion 52. The space thus formed is formed as a gas introduction portion 57 into which the plasma generation gas supplied by the gas supply pipe 41 is introduced. The gas supply hole 43 of the gas supply pipe 41 is positioned in the gas introduction portion 57 and opened to the gas introduction portion 57. The gas introduction portion 57 is defined by closely attaching the support plate 50 and the plate-shaped conductor portion 52.

A large number of through holes 53 and 54 penetrating in the thickness direction are formed in the pair of plate-shaped conductor portions 51 and 52, respectively. That is, in the plate-shaped conductor portion 52 positioned on the side where the plasma generation gas supplied by the gas supply pipe 41 flows in, a plurality of through holes 54 are formed at predetermined intervals in a matrix form when viewed in the thickness direction of the plate-shaped conductor portion 52, and in the plate-shaped conductor portion 51 positioned on the side where the plasma gas generated by the plasma generation gas flows out, a plurality of through holes 53 are formed at predetermined intervals in a matrix form when viewed in the thickness direction of the plate-shaped conductor portion 51.

The through hole 53 of the plate-shaped conductor portion 51 and the through hole 54 of the plate-shaped conductor portion 52 are cylindrical holes, and both the through holes 53 and 54 are coaxially disposed. That is, the through hole 53 of the plate-shaped conductor portion 51 and the through hole 54 of the plate-shaped conductor portion 52 are disposed so that the center of the through hole 53 of the plate-shaped conductor portion 51 and the center of the through hole 54 of the plate-shaped conductor portion 52 are aligned. The through hole 53 of the plate-shaped conductor portion 51 is smaller in diameter than the through hole 54 of the plate-shaped conductor portion 52 on the gas inflow side. As described above, the plurality of through holes 53 and 54 are formed in the pair of plate-shaped conductor portions 51 and 52 to form a hollow electrode structure, and the generated plasma gas flows through the plurality of through holes 53 and 54 at high density.

The gap portion 56 is interposed between the parallel plate type plate-shaped conductor portions 51 and 52, and the gap portion 56 functions as a capacitor having a capacitance. Specifically, a conductive portion (not illustrated) is formed of a conductive member on the support plate 50 and the plate-shaped conductor portions 51 and 52, the support plate 50 is connected to a ground 63 by the conductive portion, and the plate-shaped conductor portion 52 is also connected to the ground 63. In addition, one end portion of a radio frequency power supply (RF) 61 is connected to the ground 63, and the other end portion of the radio frequency power supply 61 is electrically connected to the plate-shaped conductor portion 51 via a matching box (MB) 60 for adjusting a capacitance and the like to achieve matching with plasma. Therefore, in a case where the radio frequency power supply 61 is operated, a potential of the plate-shaped conductor portion 51 swings between positive and negative at a predetermined frequency such as 13.56 MHz.

<Sputtering Device 70>

Figure 7:
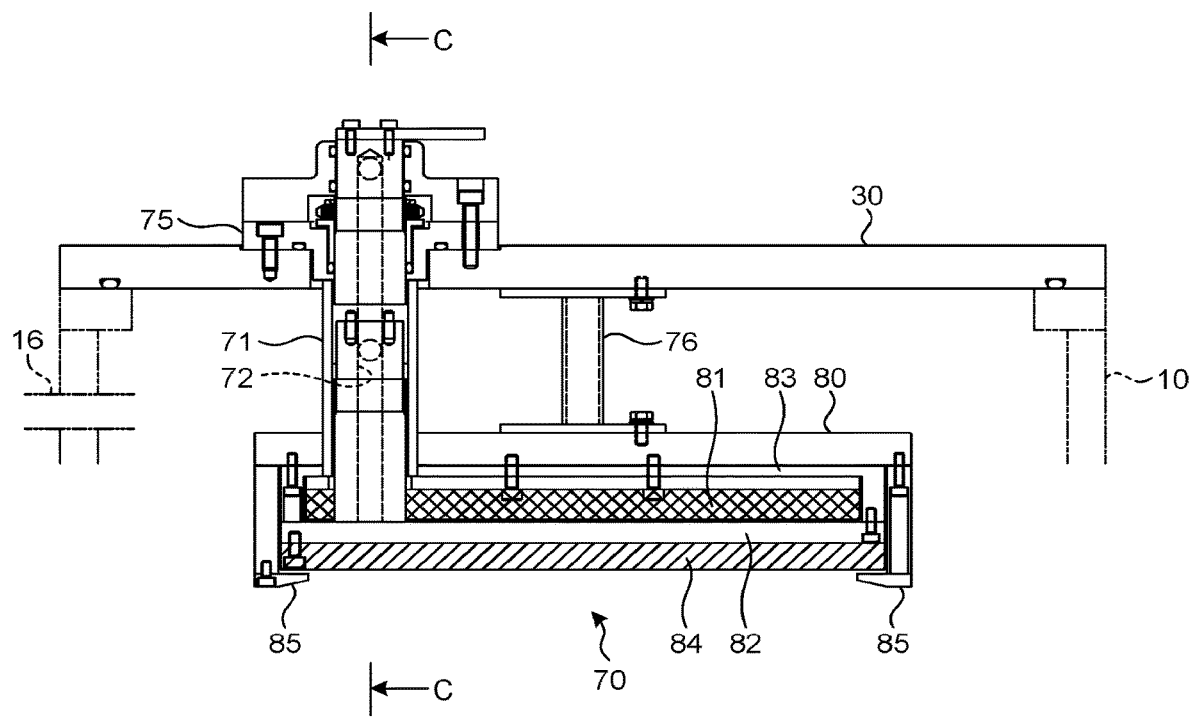
FIG. 7 is a detailed view of the sputtering device illustrated in FIG. 4.
Figure 7:
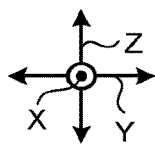
Figure 8:
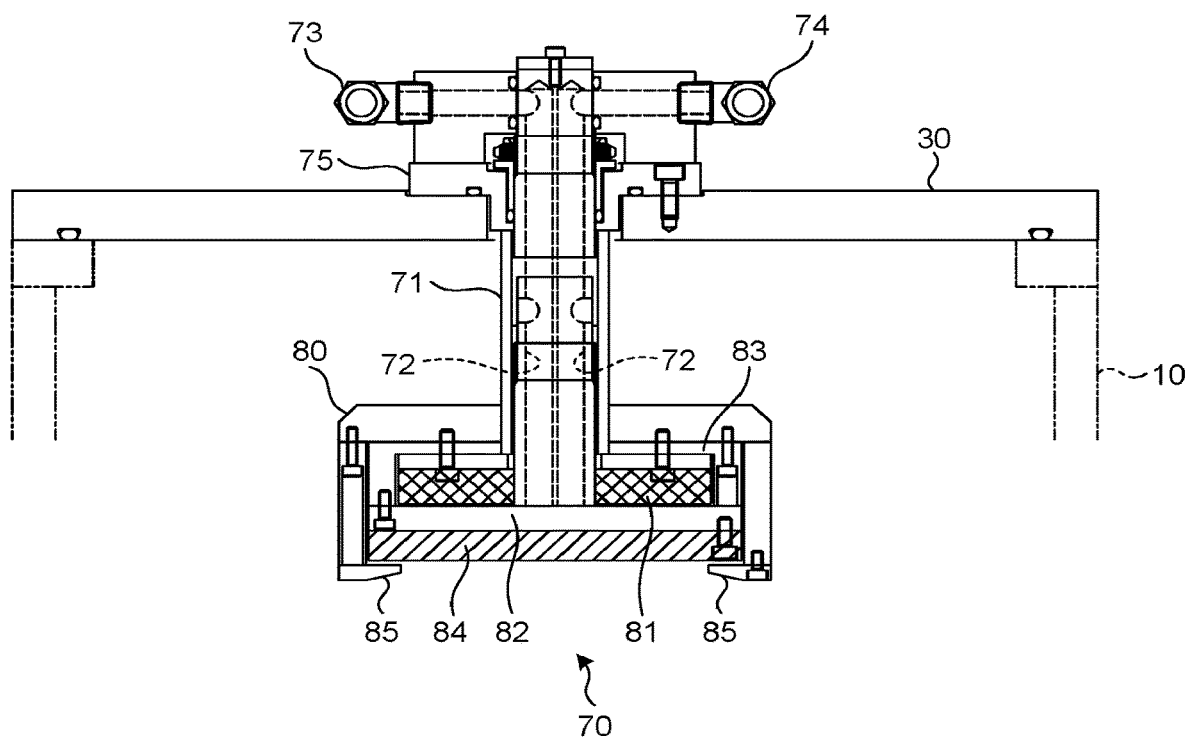
FIG. 8 is a cross-sectional view taken along line C-C of FIG. 7.
Figure 8:
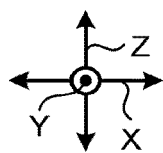

FIG. 7 is a detailed view of the sputtering device 70 illustrated in FIG. 4. FIG. 8 is a cross-sectional view taken along line C-C of FIG. 7. The sputtering device 70 includes a cooling water pipe 71 through which cooling water flows, a magnet 81 that generates a magnetic field, a target 84 from which particles such as atoms used for film formation are ejected by collision of ions when the gas flowing in from the gas inflow portion 16 is ionized by the magnetic field generated by the magnet 81, a cooling jacket 82 that cools the target 84, and a support plate 80 that supports the magnet 81, the target 84, and the cooling jacket 82. In the present embodiment, copper is used for the target 84. The cooling water pipe 71 penetrates through the second opening/closing member 30 in the thickness direction of the second opening/closing member 30, and is attached to the second opening/closing member 30 by a cooling water pipe attachment member 75.

Furthermore, cooling water paths 72 extending in an extending direction of the cooling water pipe 71 are formed inside the cooling water pipe 71, and the cooling water can be circulated between the outside of the chamber 10 and the cooling jacket 82 disposed in the chamber 10. That is, an end portion of the cooling water pipe 71 on the side positioned on the outside when the second opening/closing member 30 closes the opening 11 of the chamber 10 is connected to a water inlet 73, which is an inlet of the cooling water, and a water outlet 74, which is an outlet of the cooling water. Therefore, as the cooling water paths 72 formed inside the cooling water pipe 71, a cooling water path 72 connected to the water inlet 73 and a cooling water path 72 connected to the water outlet 74 are provided. On the other hand, an end portion of the cooling water pipe 71 on the side positioned inside the chamber 10 when the second opening/closing member 30 closes the opening 11 of the chamber 10 is connected to the cooling jacket 82. A cooling water flow path is formed inside the cooling jacket 82, and the cooling water can flow therethrough, whereby the cooling water can be circulated between the outside of the chamber 10 and the cooling jacket 82.

The support plate 80 can support the magnet 81, the cooling jacket 82, and the target 84 in an overlapping state. Specifically, the support plate 80, the magnet 81, the cooling jacket 82, and the target 84 are all formed in a plate shape, and the support plate 80 is formed so as to be larger in plan view than the magnet 81, the cooling jacket 82, and the target 84. Therefore, the magnet 81, the cooling jacket 82, and the target 84 are held by the support plate 80 and a holding member 85 in a manner in which a portion in the vicinity of an outer periphery of a surface of the target 84 that is opposite to a surface facing the cooling jacket 82 is supported by the holding member 85 in a state in which the magnet 81, the cooling jacket 82, and the target 84 overlap one another in this order from the support plate 80 side. The magnet 81, the cooling jacket 82, and the target 84 held by the holding member 85 are also held in a state in which outer peripheral portions thereof are surrounded by the holding member 85.

At this time, an insulating material 83 is disposed between the support plate 80 and the magnet 81, and the insulating material 83 is also disposed on the outer peripheral portion of the magnet 81 in plan view. That is, the insulating material 83 is disposed between the support plate 80 and the magnet 81 and between the magnet 81 and the holding member 85. Therefore, the magnet 81 is held by the support plate 80 and the holding member 85 via the insulating material 83.

A surface of the support plate 80 on the side where the magnet 81 and the like are held is positioned opposite to the side where the second opening/closing member 30 is positioned, and a surface opposite to the side where the magnet 81 and the like are held is disposed so as to face the second opening/closing member 30, and is supported by a support member 76. The support member 76 includes a cylindrical member and attachment members positioned at both ends of the cylindrical member. The attachment member on one end side is attached to the second opening/closing member 30, and the attachment member on the other end side is attached to the support plate 80. At this time, the support plate 80 is attached at a position near a central portion when the support plate 80 is viewed in the thickness direction. Therefore, the support plate 80 is supported by the support member 76 disposed between and attached to the support plate 80 and the second opening/closing member 30.

Note that the cooling water pipe 71 having one end connected to the cooling jacket 82 penetrates through the support plate 80, the magnet 81, and the insulating material 83 from the side of the support plate 80 opposite to the surface on the side where the magnet 81 and the like are held, at a position different from a position where the support member 76 is disposed. Accordingly, the cooling water pipe 71 is connected to the cooling jacket 82.

<Housing Unit Support Member 110>

Figure 9:
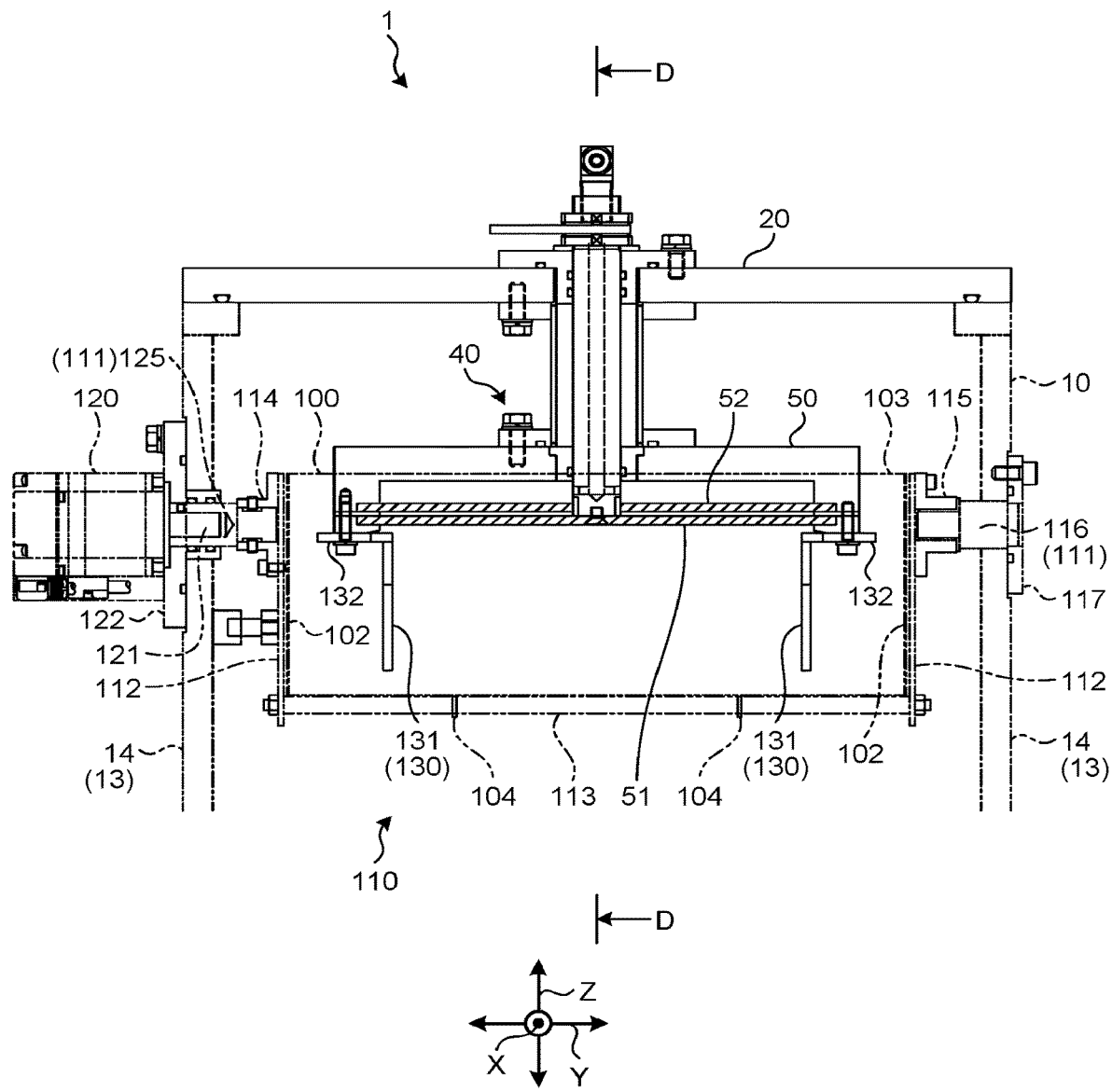
FIG. 9 is an explanatory diagram illustrating a housing unit, a housing unit support member, and a correction plate illustrated in FIG. 1, and is an explanatory diagram in a state in which the plasma generation device is positioned in the chamber.
Figure 10:
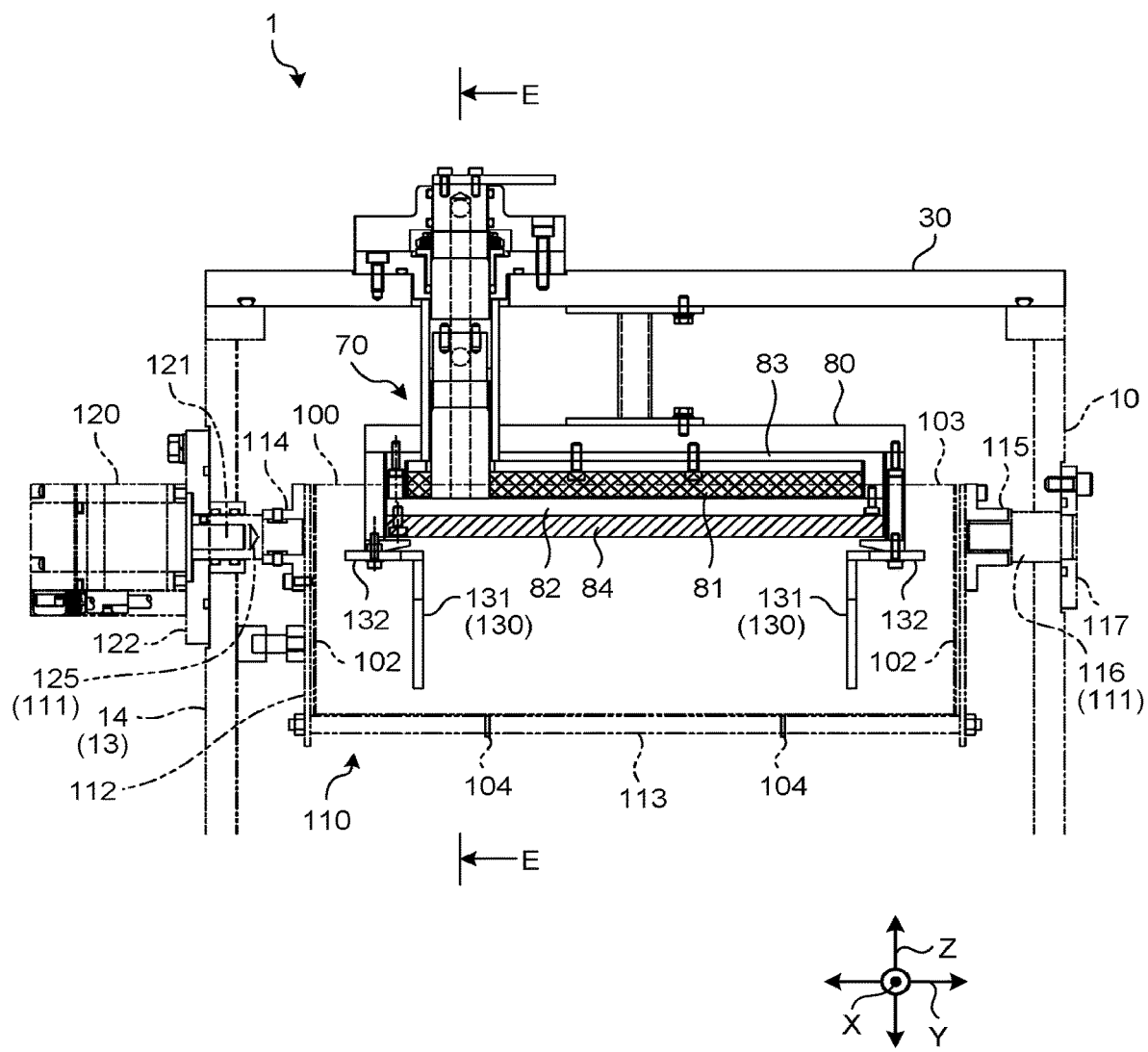
FIG. 10 is an explanatory diagram illustrating the housing unit, the housing unit support member, and the correction plate illustrated in FIG. 1, and is an explanatory diagram in a state in which the sputtering device is positioned in the chamber.
Figure 11:
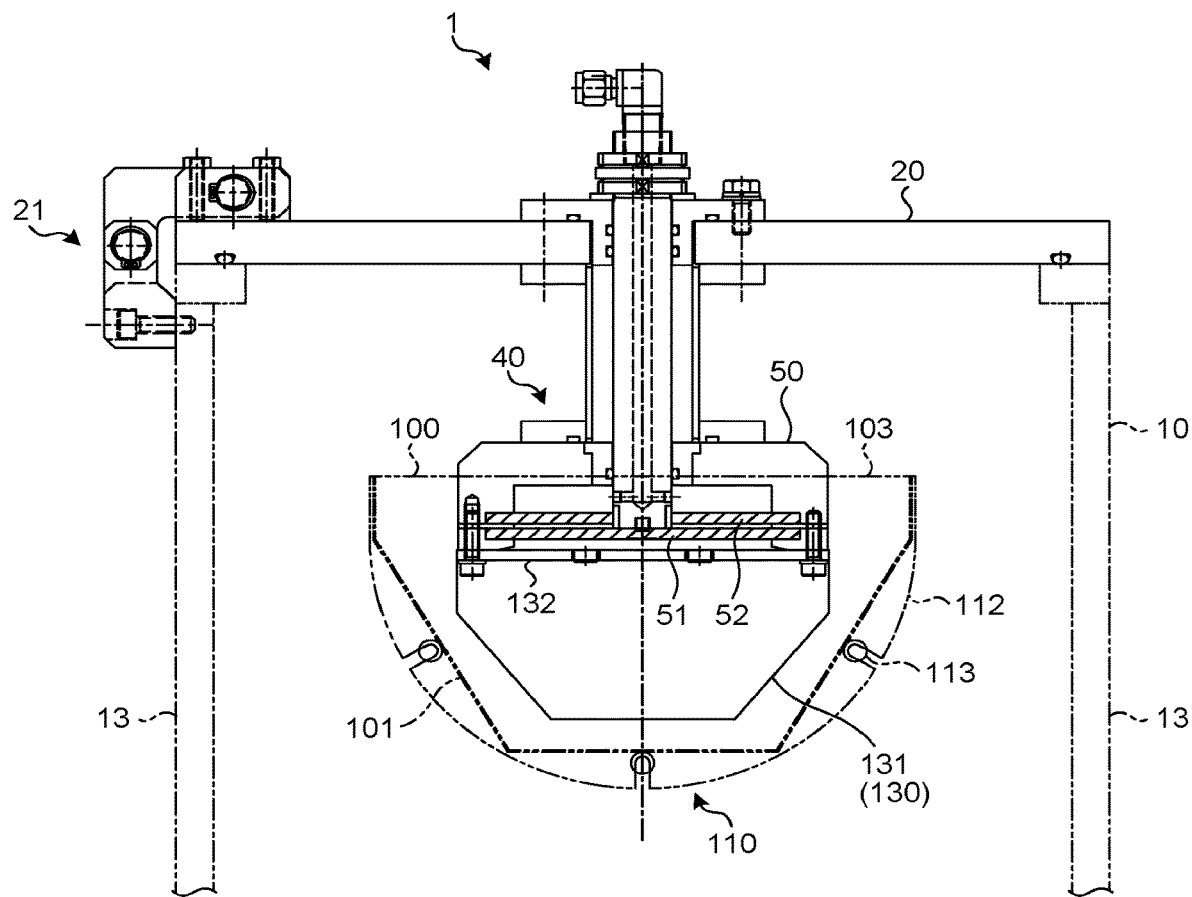
FIG. 11 is a cross-sectional view taken along line D-D of FIG. 9.
Figure 12:
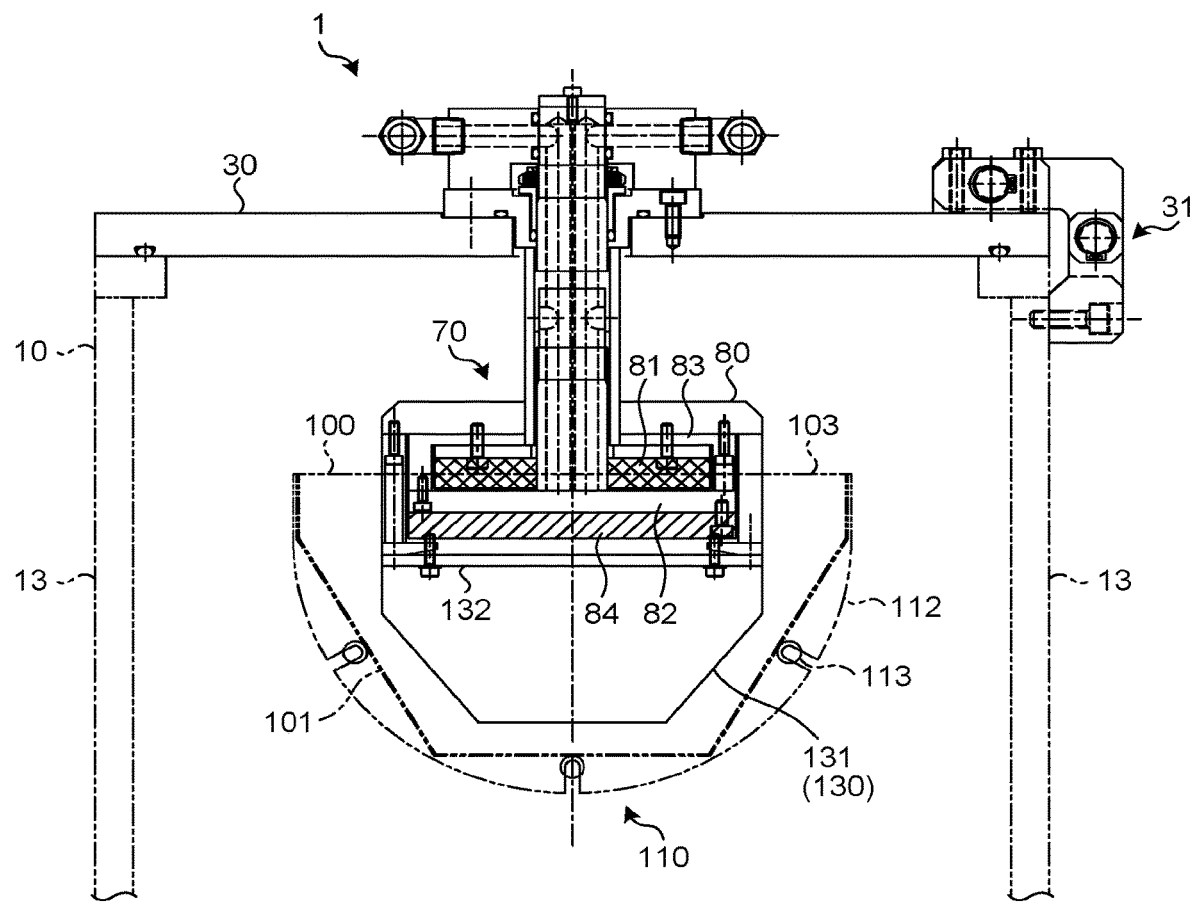
FIG. 12 is a cross-sectional view taken along line E-E of FIG. 10.

FIGS. 9 and 10 are explanatory diagrams illustrating the housing unit 100, the housing unit support member 110, and correction plates 130 illustrated in FIG. 1, FIG. 9 is an explanatory diagram in a state in which the plasma generation device 40 is positioned in the chamber 10, and FIG. 10 is an explanatory diagram in a state in which the sputtering device 70 is positioned in the chamber 10. FIG. 11 is a cross-sectional view taken along line D-D of FIG. 9. FIG. 12 is a cross-sectional view taken along line E-E of FIG. 10. The housing unit support member 110 is supported in a manner in which the swing shafts 111 are connected to the support walls 14, which are a set of side walls 13 facing each other, among the plurality of side walls 13 of the chamber 10, and the housing unit support member 110 can swing by a driving force transmitted from the servomotor 120, which is the swinging means. Specifically, the housing unit support member 110 includes a pair of side plates 112 spaced apart from each other in the length direction Y inside the chamber 10 and disposed parallel to the support walls 14, and an attachment member 113 extending in the length direction Y and disposed between the pair of side plates 112. Each of the side plates 112 is formed in a substantially semicircular plate shape, and is disposed so that a flat portion of the semicircle is positioned near the opening 11 of the chamber 10 and an arcuate portion of the semicircle is positioned near the bottom portion 15 of the chamber 10.

In addition, an interval between the side plates 112 in the length direction Y is larger than the sizes of the plasma generation device 40 and the sputtering device 70 in the same direction in a state in which the plasma generation device 40 or the sputtering device 70 is positioned in the chamber 10. Specifically, the side plate 112 is disposed at a position and has a size in which a position in the vertical direction Z in the chamber 10 can include a position of an end portion of the chamber 10 of the plasma generation device 40 or the sputtering device 70 on the bottom portion 15 side in the vertical direction Z in a state in which the plasma generation device 40 or the sputtering device 70 is positioned in the chamber 10.

The length of the flat portion of the semicircle of the side plate 112 is larger than the width of the plasma generation device 40 or the sputtering device 70 in the width direction X. In other words, the entire width of the side plate 112 in the width direction X is larger than the entire width of the plasma generation device 40 or the sputtering device 70 in the width direction X in a range in which the position of the side plate 112 in the vertical direction Z overlaps the plasma generation device 40 or the sputtering device 70. In addition, since the side plate 112 is formed in a substantially semicircular shape and is disposed so that the arcuate portion is positioned near the bottom portion 15 of the chamber 10, the width of the side plate 112 in the width direction X decreases from the upper side toward the lower side.

The swing shaft 111 is provided for each of the pair of side plates 112 so that a shaft center is parallel to the length direction Y, and different swing shafts 111 are connected to the side plates 112. Among the swing shafts 111, a drive shaft 125 that is connected to an output shaft 121 of the servomotor 120 and rotates integrally with the output shaft 121 is used as the swing shaft 111 where the servomotor 120 for swinging the housing unit 100 is positioned. That is, the servomotor 120 is attached to one support wall 14 in the set of support walls 14. The servomotor 120 is attached to an outer surface of the chamber 10 on the support wall 14 by a servomotor attachment member 122, and the output shaft 121 that outputs the driving force generated by the servomotor 120 penetrates through the support wall 14 and extends from the support wall 14 into the chamber 10. The drive shaft 125 is disposed in the chamber 10, and is connected to the output shaft 121 in a state in which relative rotation with respect to the output shaft 121 of the servomotor 120 is not allowed in the chamber 10, that is, in a state in which the drive shaft 125 is integrally rotatable with respect to the output shaft 121. Further, an end portion of the drive shaft 125 that is opposite to an end portion on the side connected to the output shaft 121 of the servomotor 120 is connected to the side plate 112 by a swinging means shaft connection portion 114. As a result, the drive shaft 125 is used as the swing shaft 111, and the driving force generated by the servomotor 120 is transmitted from the output shaft 121 of the servomotor 120 to the drive shaft 125, and can be transmitted from the drive shaft 125 to the side plate 112 of the housing unit support member 110.

Among the swing shafts 111, a support shaft 116 is used as the swing shaft 111 positioned opposite to the side where the servomotor 120 is positioned. One end of the support shaft 116 is supported by a support shaft support member 117, and the other end of the support shaft 116 is connected to the side plate 112 by a support shaft connection portion 115. A portion in the vicinity of an end portion of the support shaft 116 on the side supported by the support shaft support member 117 penetrates through the support wall 14 and is supported in a non-rotatable state by the support shaft support member 117 from the outer surface of the chamber 10 on the support wall 14. A portion in the vicinity of an end portion of the support shaft 116 on the side connected to the support shaft connection portion 115 is supported by the support shaft connection portion 115 attached to the side plate 112, and the support shaft connection portion 115 and the support shaft 116 can relatively rotate around the shaft center of the support shaft 116.

The side plate 112 on the side connected to the drive shaft 125 and the side plate 112 on the side connected to the support shaft 116 are connected by the attachment member 113 disposed between the side plates 112. The attachment member 113 is formed of a rod-like member extending in the length direction Y, and both ends thereof are attached to different side plates 112. A plurality of attachment members 113 are disposed near an outer periphery of the arcuate portion of the side plate 112 formed in a substantially semicircular shape. Thus, the pair of side plates 112 are connected to each other by the plurality of attachment members 113. Therefore, when the side plate 112 on the side connected to the drive shaft 125 swings by the driving force transmitted from the servomotor 120, a force in a swing direction is also transmitted to the other side plate 112, and the pair of side plates 112 can swing integrally.

<Housing Unit 100>

Figure 13:
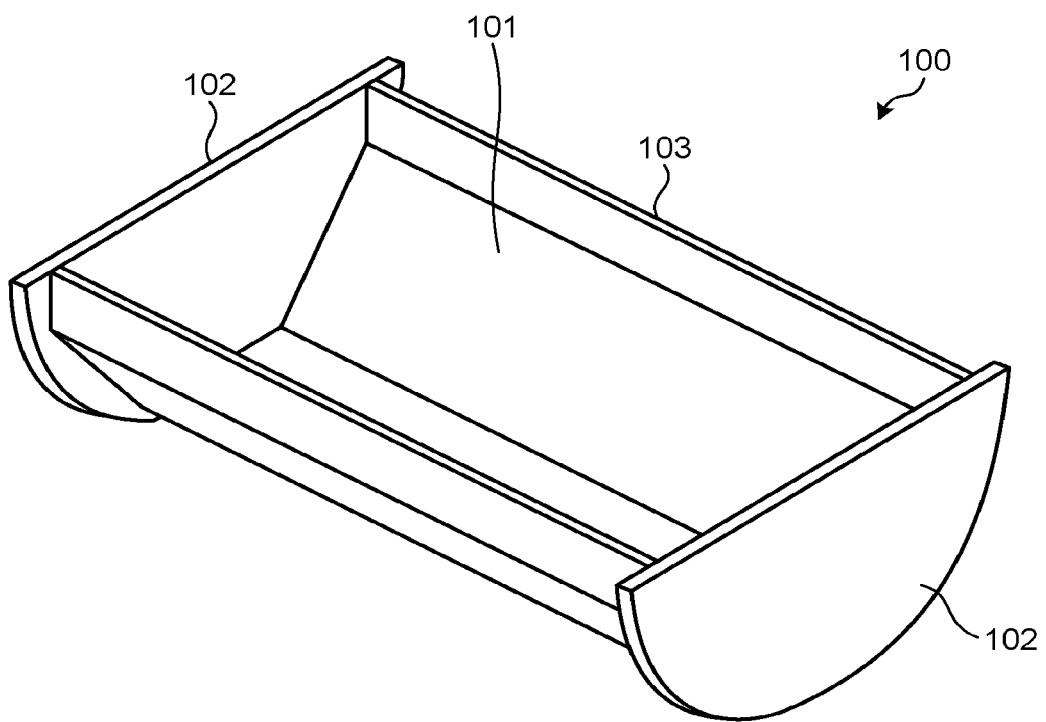
FIG. 13 is a schematic perspective view of the housing unit illustrated in FIG. 9.
Figure 13:
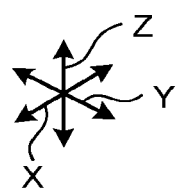

The housing unit support member 110 formed in this manner can support the housing unit 100. FIG. 13 is a schematic perspective view of the housing unit 100 illustrated in FIG. 9. The housing unit 100 is formed in a basket shape by a workpiece holding wall 101 and side walls 102. Among them, the side wall 102 is formed of a plate-like member disposed parallel to the side plate 112 in the vicinity of the side plate 112 of the housing unit support member 110 in a state in which the housing unit 100 is supported by the housing unit support member 110, and a pair of the side walls 102 are disposed similarly to the side plates 112. An interval between the pair of side walls 102 is slightly smaller than the interval between the pair of side plates 112.

Further, in a state of being supported by the housing unit support member 110, the width of the side wall 102 in the width direction X decreases from the opening 11 side of the chamber 10 toward the bottom portion 15 side of the chamber 10, similarly to the side plate 112 of the housing unit support member 110. In the present embodiment, the side wall 102 is formed in a substantially trapezoidal shape, and is disposed so that the longer one of an upper base and a lower base of the trapezoidal shape is positioned on the upper side while being supported by the housing unit support member 110, and the shorter one is positioned on the lower side. As a result, the width of the side wall 102 in the width direction X decreases from the upper side toward the lower side.

Further, in the side wall 102, the longer one of the upper base and the lower base of the trapezoidal shape that is positioned on the upper side extends upward. That is, the side wall 102 is formed in a substantially pentagonal shape in which a rectangle having the same length is added to the longer one of the upper base and the lower base of the trapezoidal shape, when viewed in the length direction Y. As a result, the width of the side wall 102 in the width direction X decreases from the upper side toward the lower side.

The workpiece holding wall 101 is disposed between the pair of side walls 102, and is formed along a side other than an upper side of the pentagonal shape on an outer periphery of the side wall 102. As a result, in the housing unit 100, only a portion on the opening 11 side of the chamber 10 in a state of being supported by the housing unit support member 110 is opened, and this portion is an opening 103 of the housing unit 100. As the opening 103 is formed in this manner, the housing unit 100 is formed in a basket shape, and the workpiece W to be housed in the housing unit 100 can be taken in and out through the opening 103. In addition, the opening 103 of the housing unit 100 has a size that allows the support plate 50 of the plasma generation device 40 or the support plate 80 of the sputtering device 70 to be inserted when the plasma generation device 40 or the sputtering device 70 is disposed in the chamber 10.

The workpiece holding wall 101 of the housing unit 100 is formed of a plate-like member having a large number of holes such as a punching plate. In the housing unit 100, the workpiece holding wall 101 is formed of a member having a large number of holes, such that air permeability is provided between the inside and the outside of the housing unit 100 via the workpiece holding wall 101.

An attachment plate 104 used when the housing unit 100 is supported by the housing unit support member 110 is disposed on the outer surface side of the workpiece holding wall 101 in the housing unit 100. A plurality of the attachment plates 104 are disposed on the outer surface side of the workpiece holding wall 101 so that a thickness direction of the attachment plate 104 is the same as the thickness direction of the side wall 102. In the present embodiment, the attachment plates 104 are disposed at two positions between the pair of side walls 102. In the attachment plate 104, a notch (not illustrated) through which the attachment member 113 passes is formed at a position where the attachment member 113 of the housing unit support member 110 is disposed when viewed in the length direction Y. Therefore, when the housing unit 100 is supported by the housing unit support member 110, the attachment member 113 of the housing unit support member 110 can be inserted into the notch formed in the attachment plate 104 of the housing unit 100. As a result, the housing unit 100 can be supported by the housing unit support member 110 in a state in which relative movement of the housing unit 100 with respect to the housing unit support member 110 in a direction in which the housing unit support member 110 swings can be restricted.

<Correction Plate 130>

In addition, the surface treatment device 1 includes correction plates 130 that are disposed in at least one of the housing unit 100, the plasma generation device 40, or the sputtering device 70 and limit a range in which the workpiece W is disposed. In the present embodiment, device-side correction plates 131 attached to the plasma generation device 40 and the sputtering device 70 are provided as the correction plates 130. As the device-side correction plates 131 attached to the plasma generation device 40, a pair of device-side correction plates 131 are disposed between a pair of side walls 102 in a direction parallel to the side walls 102 of the housing unit 100 in a case where the plasma generation device 40 is positioned in the chamber 10 in which the housing unit 100 is disposed. That is, the pair of device-side correction plates 131 are disposed so as to face each other.

Each of the pair of device-side correction plates 131 includes an attachment portion 132, and the attachment portion 132 of the device-side correction plate 131 attached to the plasma generation device 40 is attached to a lower surface of the holding member 58 of the plasma generation device 40. That is, the attachment portion 132 is positioned at an upper end of the device-side correction plate 131 when the device-side correction plate 131 is viewed in the width direction X, and the attachment portion 132 is formed in a plate shape whose thickness direction is the vertical direction Z. As the attachment portion 132 formed in this manner is attached to the lower surface of the holding member 58 of the plasma generation device 40, the device-side correction plate 131 is attached to a lower surface of the plasma generation device 40. Further, as the device-side correction plate 131 is attached to the holding member 58 of the plasma generation device 40, an interval between the device-side correction plates 131 is substantially the same as the width of the support plate 50 of the plasma generation device 40 in the length direction Y. Specifically, the interval between the pair of device-side correction plates 131 attached to the plasma generation device 40 is substantially the same as the width of the gas introduction portion 57 of the plasma generation device 40 in the length direction Y.

In addition, the width of the device-side correction plate 131 attached to the plasma generation device 40 in the width direction X is substantially the same as the width of the support plate 50 of the plasma generation device 40 in the same direction. In addition, the height of the device-side correction plate 131 in the vertical direction Z is a height at which the device-side correction plate 131 can be separated from the housing unit 100 in the vertical direction Z when the plasma generation device 40 is positioned in the chamber 10 in which the housing unit 100 is supported by the housing unit support member 110.

Similarly, the attachment portion 132 of the device-side correction plate 131 attached to the sputtering device 70 is attached to the lower surface of the holding member 85 of the sputtering device 70, thereby being attached to the sputtering device 70. The interval between the device-side correction plates 131 attached to the sputtering device 70 is substantially the same as the width of the support plate 80 of the sputtering device 70 in the length direction Y. Specifically, the interval between the pair of device-side correction plates 131 attached to the sputtering device 70 is substantially the same as the width of the magnet 81 of the sputtering device 70 in the length direction Y.

Further, the width of the device-side correction plate 131 attached to the sputtering device 70 in the width direction X is substantially the same as the width of the support plate 80 of the sputtering device 70 in the same direction. In addition, the height of the device-side correction plate 131 in the vertical direction Z is a height at which the device-side correction plate 131 can be separated from the housing unit 100 in the vertical direction Z when the sputtering device 70 is positioned in the chamber 10 in which the housing unit 100 is supported by the housing unit support member 110.

Figure 14:
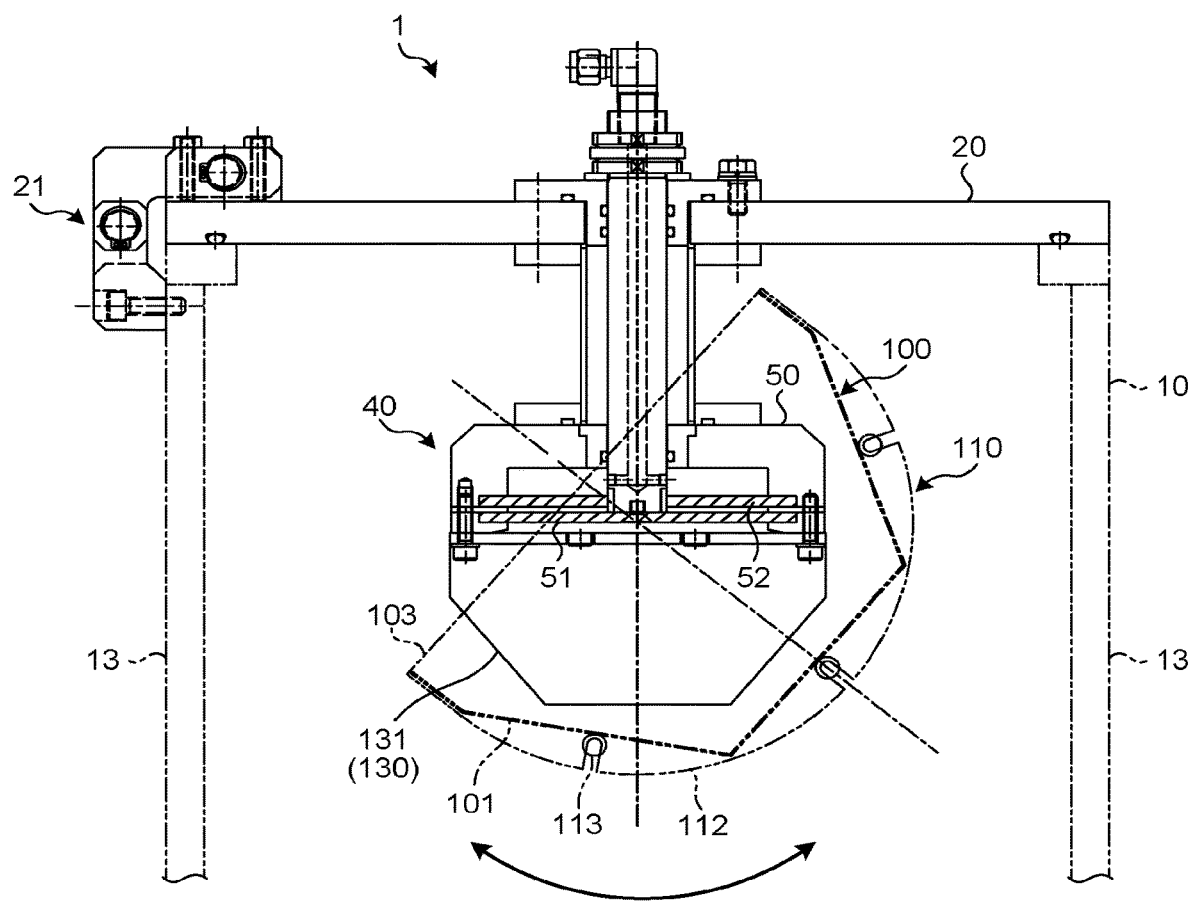
FIG. 14 is an explanatory diagram illustrating a state in which the housing unit and the housing unit support member illustrated in FIG. 11 swing.
Figure 15:
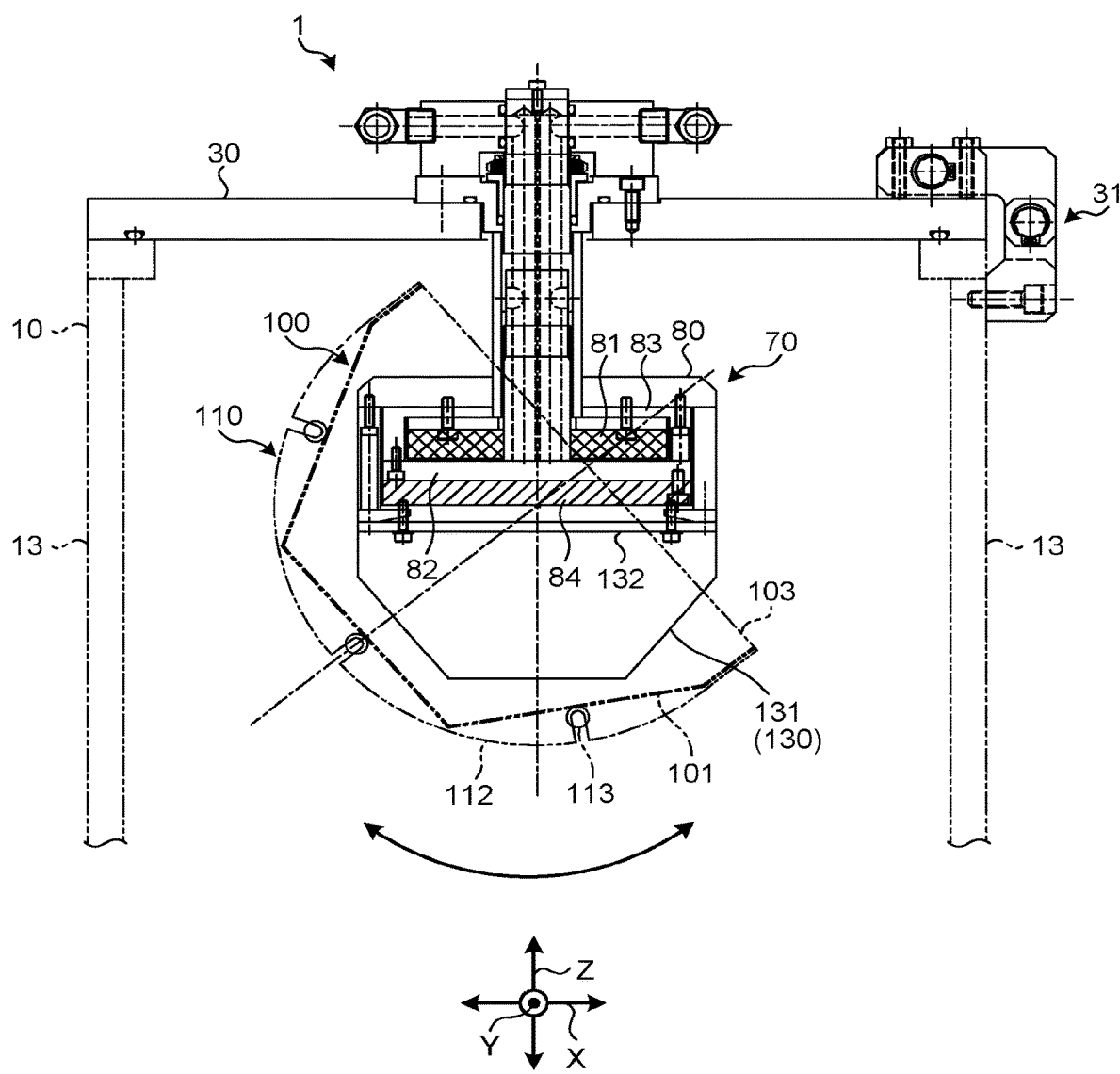
FIG. 15 is an explanatory diagram illustrating a state in which the housing unit and the housing unit support member illustrated in FIG. 12 swing.

FIG. 14 is an explanatory diagram illustrating a state in which the housing unit 100 and the housing unit support member 110 illustrated in FIG. 11 swing. FIG. 15 is an explanatory diagram illustrating a state in which the housing unit 100 and the housing unit support member 110 illustrated in FIG. 12 swing. The device-side correction plate 131 attached to the plasma generation device 40 and the device-side correction plate 131 attached to the sputtering device 70 have substantially the same shape, and are disposed at substantially the same position in the chamber 10 when positioned in the chamber 10. Further, the device-side correction plate 131 is chamfered at both sides in the width direction X and a lower end side, such that the device-side correction plate 131 does not abut on the housing unit 100 when the housing unit 100 swings integrally with the housing unit support member 110 around the swing shafts 111.

Note that, in the surface treatment device 1 according to the present embodiment, a swing angle when the housing unit support member 110 swings around the swing shafts 111 is about 50° from a position where the housing unit support member 110 is neutral to both sides in the swing direction, that is, about 100° in total. The position at which the housing unit support member 110 is neutral herein refers to a position at which the opening 103 of the housing unit 100 faces directly upward when the housing unit 100 is mounted on the housing unit support member 110.

<Pump Unit 140>

Figure 16:
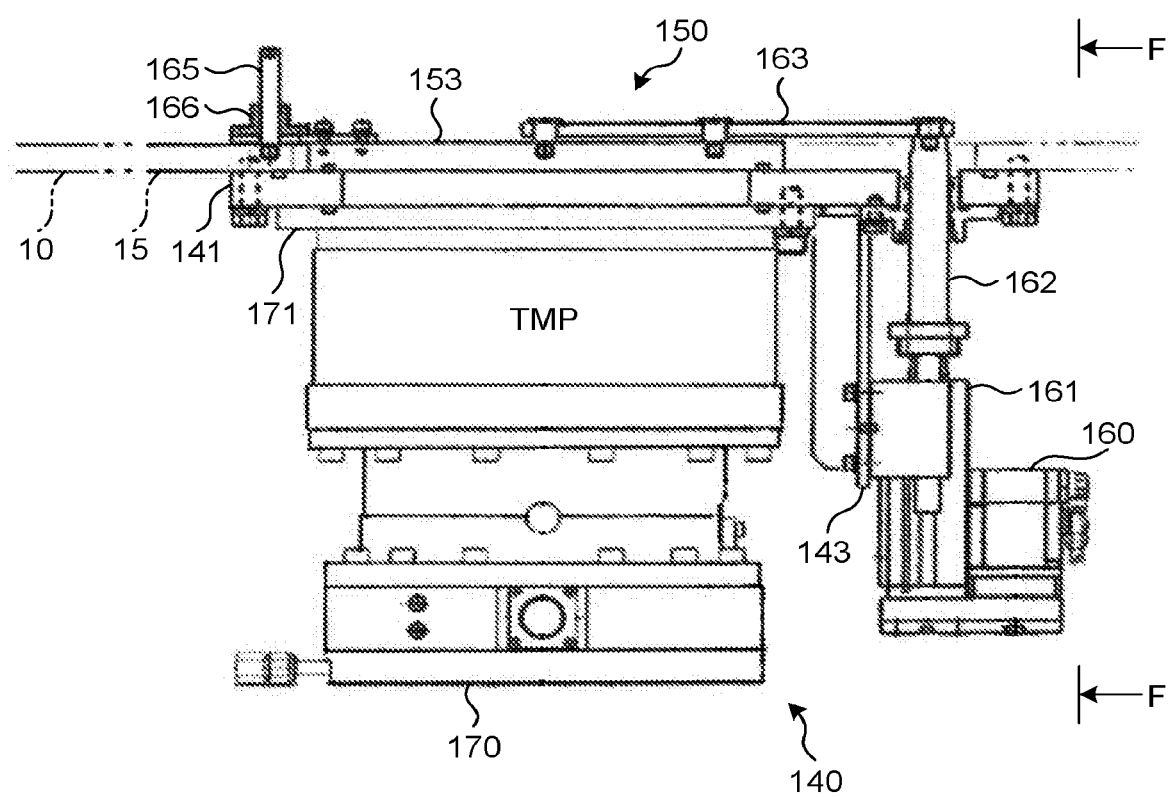
FIG. 16 is a detailed view of a pump unit illustrated in FIG. 1.
Figure 16:
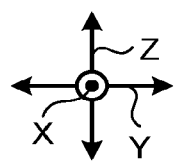
Figure 17:
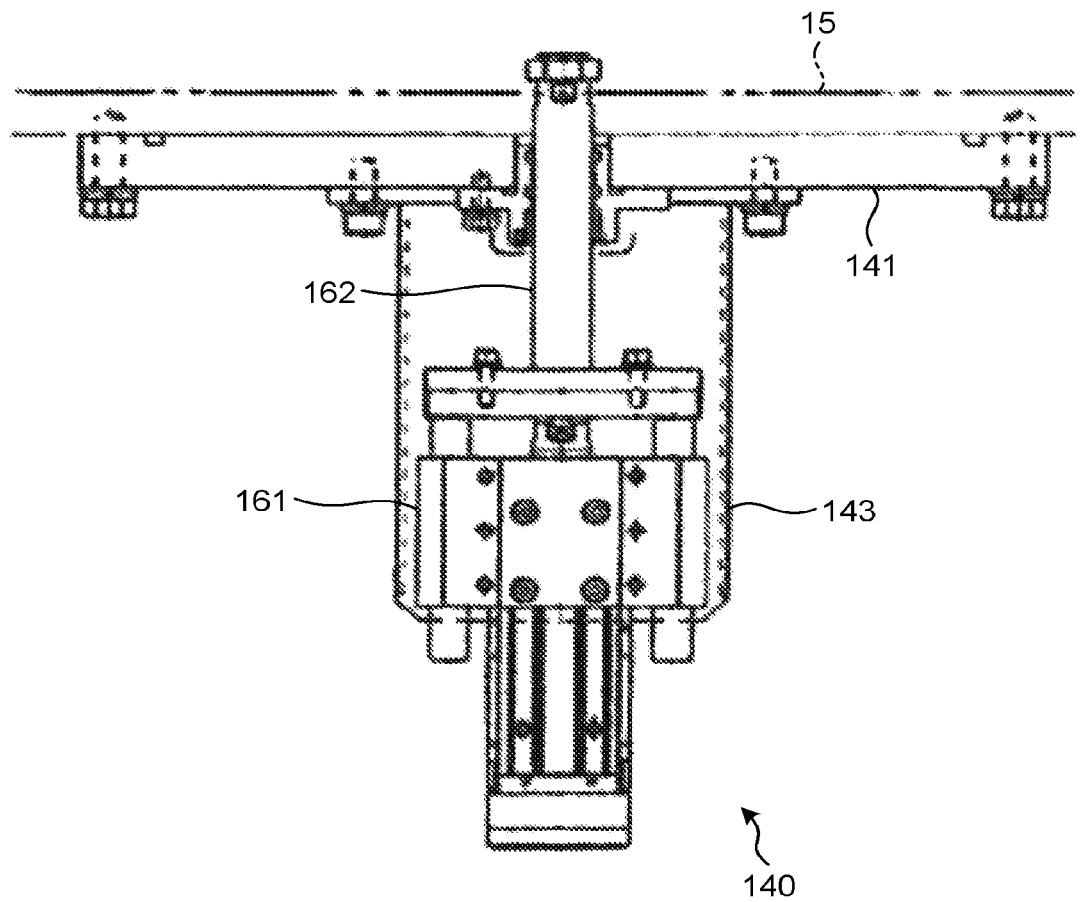
FIG. 17 is a detailed view of a lifting shaft and a worm jack when viewed from an F-F direction of FIG. 16.
Figure 17:
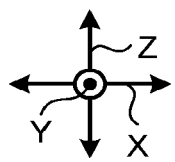
Figure 18:
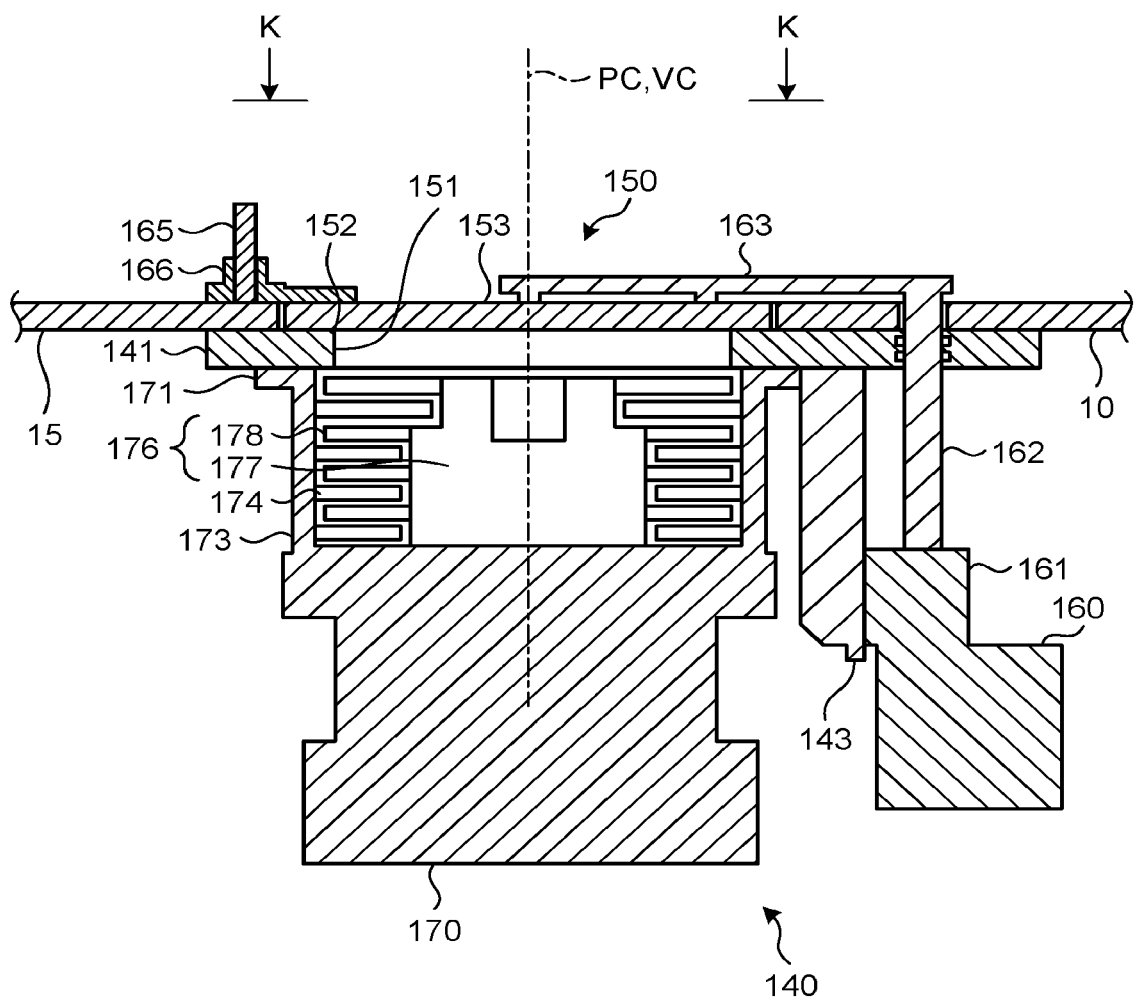
FIG. 18 is a schematic cross-sectional view of FIG. 16.
Figure 18:
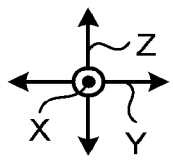
Figure 19:
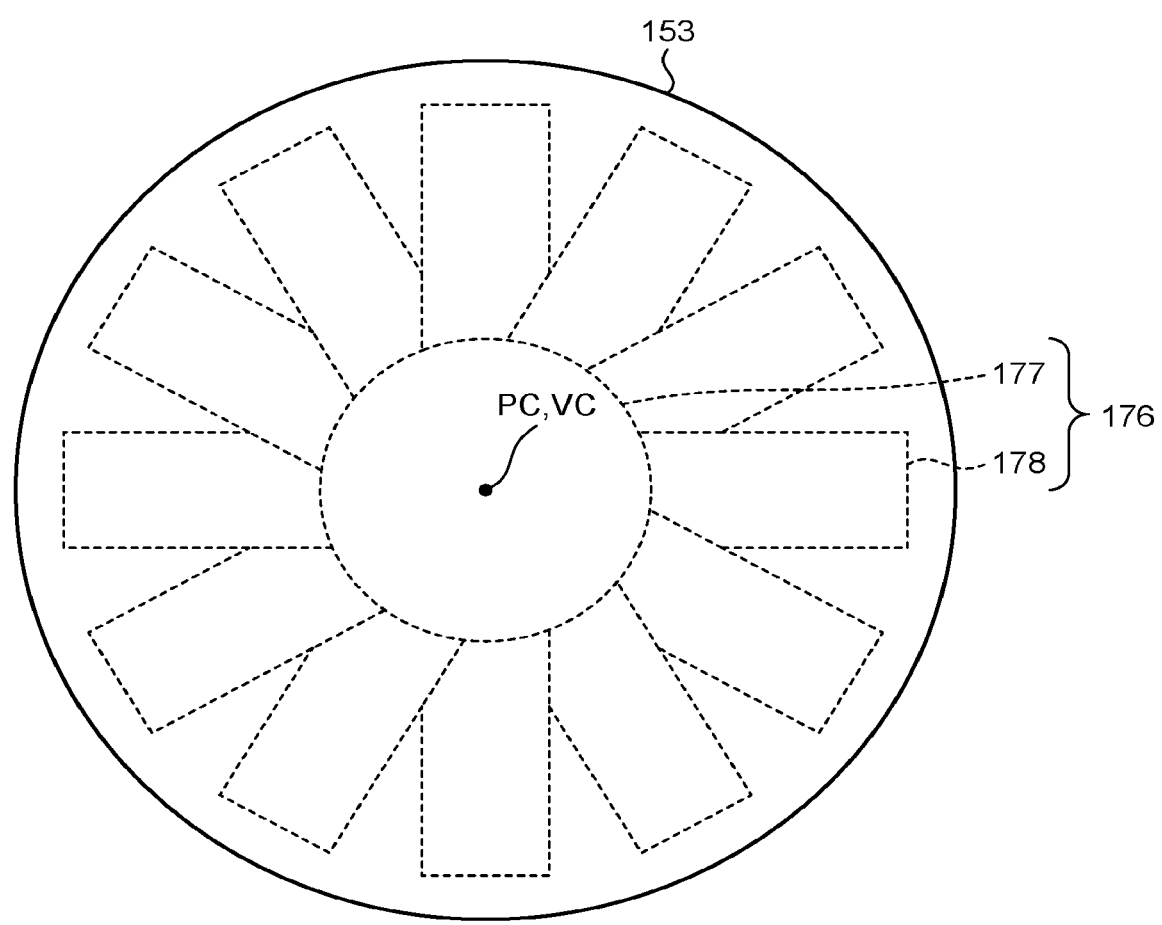
FIG. 19 is a view in an arrow direction K-K of FIG. 18.
Figure 20:
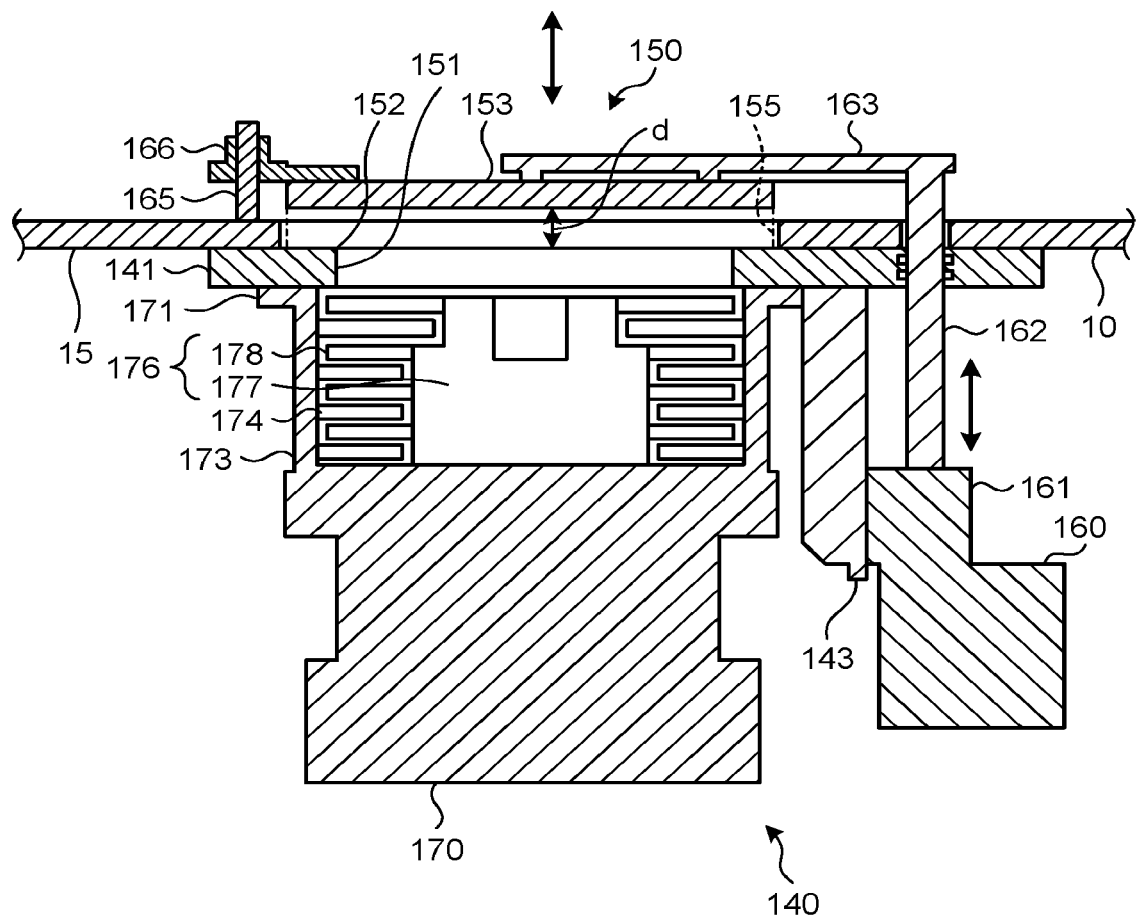
FIG. 20 is an explanatory diagram illustrating a state in which a lifting valve illustrated in FIG. 18 opens an opening.
Figure 20:
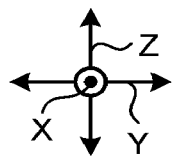

FIG. 16 is a detailed view of the pump unit 140 illustrated in FIG. 1. FIG. 17 is a detailed view of the lifting shaft 162 and the worm jack 161 when viewed from an F-F direction of FIG. 16. FIG. 18 is a schematic cross-sectional view of FIG. 16. FIG. 19 is a view in an arrow direction K-K of FIG. 18. FIG. 20 is an explanatory diagram illustrating a state in which the lifting valve 153 illustrated in FIG. 18 opens an opening 152. Note that FIGS. 18 and 20 illustrates an internal structure of a part of the turbo molecular pump 170 and a contour shape of the other parts of the turbo molecular pump 170. The pump unit 140 attached to the bottom portion 15 of the chamber 10 includes the flow rate adjustment valve 150 and the turbo molecular pump 170. The flow rate adjustment valve 150 according to the present embodiment includes a flow path portion 151 in which a fluid flows, the lifting valve 153 that opens and closes the opening 152 formed at one end of the flow path portion 151, and a servo actuator 160 which is a driving means that causes the lifting valve 153 to perform an opening/closing operation. The turbo molecular pump 170 is a pump that sucks the fluid flowing in the flow path portion 151 of the flow rate adjustment valve 150.

Specifically, the flow path portion 151 of the flow rate adjustment valve 150 is formed in an attachment flange 141 for attaching the pump unit 140 to the chamber 10, and the turbo molecular pump 170 is attached to the attachment flange 141 by attaching a pump flange 171 of the turbo molecular pump 170 to the attachment flange 141. The attachment flange 141 is a plate-shaped member, and the flow path portion 151 is formed as a hole penetrating in the thickness direction of the attachment flange 141. The opening 152 of the flow path portion 151 is positioned on one end side of the flow path portion 151 penetrating through the attachment flange 141 in this manner, and the turbo molecular pump 170 is attached to a surface of the attachment flange 141 opposite to a surface on the side where the opening 152 of the flow path portion 151 is positioned. As a result, the turbo molecular pump 170 is disposed opposite to the end portion side where the opening 152 is formed in the flow path portion 151.

The pump unit 140 is attached to the chamber 10 by attaching the attachment flange 141 to a lower surface of the bottom portion 15 of the chamber 10. The attachment flange 141 is attached so that a surface of the attachment flange 141 on the side where the opening 152 of the flow path portion 151 is positioned is positioned adjacent to the chamber 10, and a surface of the attachment flange 141 on the side where the turbo molecular pump 170 is attached is positioned opposite from the chamber 10. As a result, the attachment flange 141 is attached so that a flow direction when the fluid flows in the flow path portion 151 is the vertical direction Z and the opening 152 is positioned at an upper end of the flow path portion 151. In other words, the flow path portion 151 is disposed so that an opening direction of the opening 152 is the vertical direction Z. In a state in which the attachment flange 141 is attached to the bottom portion 15 of the chamber 10, the opening 152 of the flow path portion 151 is opened to the inside of the chamber 10, and the flow path portion 151 communicates with the inside of the chamber 10.

The turbo molecular pump 170 attached to the attachment flange 141 includes a casing 173 which is a casing in the turbo molecular pump 170, and an impeller 176 which rotates around a rotation axis PC. The casing 173 is formed in a substantially cylindrical shape, and the pump flange 171 is disposed at one end in an axial direction of the cylinder that is the shape of the casing 173. Therefore, as the pump flange 171 is attached to the attachment flange 141, the turbo molecular pump 170 is attached so that the axial direction of the cylindrical shape, which is the shape of the casing 173, becomes the vertical direction Z in a state in which the turbo molecular pump 170 is attached to the chamber 10 via the attachment flange 141.

The impeller 176 of the turbo molecular pump 170 is rotatably disposed inside the casing 173 having a substantially cylindrical shape, and is disposed at a position and in a direction in which the rotation axis PC of the impeller 176 substantially coincides with a central axis of the cylindrical shape which is the shape of the casing 173. In this manner, the impeller 176 disposed inside the casing 173 is rotatable around the rotation axis PC inside the casing 173 by a driving force supplied from a driving means such as an electric motor (not illustrated) of the turbo molecular pump 170.

The impeller 176 includes a shaft 177 that rotates around the rotation axis PC, and a plurality of rotor blades 178 that extend radially from the shaft 177 and rotate integrally with the shaft 177. In a case where the plurality of rotor blades 178 radially arranged at the same position in the axial direction of the rotation axis PC form one stage, a plurality of stages of the rotor blades 178 are disposed at predetermined intervals in the axial direction of the rotation axis PC.

On the other hand, a plurality of stationary blades 174 are disposed between the stages of the rotor blades 178 in the axial direction of the rotation axis PC of the impeller 176 inside the casing 173. The stationary blades 174 are attached to the casing 173 so as not to be rotatable with respect to the casing 173, and the plurality of stationary blades 174 are radially arranged around the central axis of the cylindrical shape which is the shape of the casing 173. Similarly to the rotor blades 178 of the impeller 176, the plurality of stages of the stationary blades 174 are disposed at predetermined intervals in the axial direction in a case where the plurality of stationary blades 174 radially arranged at the same position in the axial direction of the central axis of the casing 173 form one stage.

For this reason, the rotor blades 178 of the impeller 176 and the stationary blades 174 disposed in the casing 173 are alternately disposed in the axial direction of the rotation axis PC of the impeller 176 or in the axial direction of the central axis of the casing 173. That is, the turbo molecular pump 170 is configured as a so-called axial flow pump. Therefore, the turbo molecular pump 170 can suck the fluid flowing in the flow path portion 151 by rotation of the impeller 176 around the rotation axis PC of the impeller 176.

The lifting valve 153 of the flow rate adjustment valve 150 is disposed in the chamber 10, and is disposed on the opening 152 side of the flow path portion 151, that is, above the opening 152. The lifting valve 153 can open and close the opening 152 by changing a distance d from the opening 152 in the vertical direction Z. That is, when closing the opening 152, the lifting valve 153 can cover the entire region of the opening 152 to close the opening 152, and when opening the opening 152, the lifting valve 153 can be separated from the opening 152 in the opening direction of the opening 152, that is, in the vertical direction Z, to open the opening 152. Each of the opening 152 and the lifting valve 153 has a substantially circular shape when viewed in the opening direction of the opening 152, and the diameter of the lifting valve 153 is larger than that of the opening 152. In this case, the substantially circular shape means that each of the opening 152 and the lifting valve 153 is formed in a substantially circular shape regardless of a dimensional error at the time of manufacturing or the presence or absence of slight unevenness.

As illustrated in FIGS. 18 and 19, the rotation axis PC of the turbo molecular pump 170 attached to the chamber 10 via the attachment flange 141 substantially coincides with a central axis VC of the substantial circular shape which is the shape of the lifting valve 153. In other words, the turbo molecular pump 170 and the lifting valve 153 disposed on both sides of the flow path portion 151 in the vertical direction Z are disposed in a positional relationship in which the rotation axis PC of the turbo molecular pump 170 and the central axis VC of the lifting valve 153 substantially coincide with each other.

The servo actuator 160 that opens and closes the lifting valve 153 can cause the lifting valve 153 to perform an opening/closing operation for the opening 152 by moving the lifting valve 153 in the opening direction of the opening 152, that is, the vertical direction Z. The servo actuator 160 is disposed on the surface side of the attachment flange 141 to which the turbo molecular pump 170 is attached, and is supported by a driving means support portion 143. That is, the servo actuator 160 is attached to the attachment flange 141 via the driving means support portion 143.

A driving force generated by the servo actuator 160 is transmitted to the lifting valve 153 via the worm jack 161, the lifting shaft 162, and a connection member 163, and the lifting valve 153 can move in the vertical direction Z by the driving force transmitted via the worm jack 161, the lifting shaft 162, and the connection member 163 to open and close the opening 152. Among them, the worm jack 161 can move the lifting shaft 162 in the axial direction of the lifting shaft 162 by the driving force transmitted from the servo actuator 160, and the lifting shaft 162 is disposed so that the axial direction is the vertical direction Z. Therefore, when the driving force from the servo actuator 160 is transmitted from the worm jack 161, the lifting shaft 162 moves in the vertical direction by the driving force. The lifting shaft 162 is disposed so as to penetrate through the bottom portion 15 of the chamber 10 and the attachment flange 141, and has an upper end positioned inside the chamber 10 and a lower end positioned outside the chamber 10 and below the attachment flange 141.

Note that a portion where the lifting shaft 162 penetrates through the attachment flange 141 is airtight, and the fluid does not flow on both sides of the portion where the lifting shaft 162 penetrates through the attachment flange 141. The lifting shaft 162 penetrates through the bottom portion 15 of the chamber 10.

The worm jack 161 is connected to a position near a lower end of the lifting shaft 162 and transmits the driving force transmitted from the servo actuator 160 from the position near the lower end of the lifting shaft 162 to the lifting shaft 162 to move the lifting shaft 162 in the vertical direction Z.

The connection member 163 is disposed in the chamber 10 and connects an upper end of the lifting shaft 162 and the lifting valve 153. That is, the connection member 163 is disposed over a surface of the lifting valve 153 opposite to a surface that opens and closes the opening 152 of the flow path portion 151, and the upper end of the lifting shaft 162, and is connected to both of the surfaces to connect the upper end of the lifting shaft 162 and the lifting valve 153. As a result, when the lifting shaft 162 moves in the vertical direction Z, the connection member 163 also moves in the vertical direction Z together with the lifting shaft 162, and the lifting valve 153 can also move in the vertical direction Z. The lifting valve 153 can move in the vertical direction Z by the driving force transmitted from the servo actuator 160 in this manner to open and close the opening 152 of the flow path portion 151.

The chamber 10 is provided with a valve guide 165 that guides the opening/closing operation of the lifting valve 153, and a guide engagement portion 166 that engages with the valve guide 165 is attached to the lifting valve 153. The valve guide 165 is formed in a bar-like shape extending in the vertical direction Z, which is a direction in which the lifting valve 153 moves when performing the opening/closing operation, and is disposed in the vicinity of a portion where the lifting valve 153 is positioned on an inner surface of the bottom portion 15 of the chamber 10.

Specifically, the valve guide 165 is disposed on the side of the lifting valve 153 opposite to the side where the lifting shaft 162 is positioned. The guide engagement portion 166 is attached to the upper surface side of the lifting valve 153, and is formed over the upper surface of the lifting valve 153 and the position of the valve guide 165. A through hole through which the valve guide 165 passes is formed in the guide engagement portion 166, and the valve guide 165 penetrates through the through hole formed in the guide engagement portion 166.

Since the guide engagement portion 166 is attached to the lifting valve 153, the guide engagement portion 166 also moves integrally when the lifting valve 153 moves. At this time, since the valve guide 165 extending in the vertical direction Z penetrates through the through hole formed in the guide engagement portion 166, the guide engagement portion 166 moves along the valve guide 165 when the guide engagement portion 166 moves together with the lifting valve 153. As a result, the valve guide 165 can guide the movement of the lifting valve 153 to which the guide engagement portion 166 is attached, in the vertical direction Z.

The lifting valve 153 can open and close the opening 152 of the flow path portion 151 by moving in the vertical direction Z, but when the lifting valve 153 opens the opening 152, the fluid flows from a portion between an outer peripheral portion of the lifting valve 153 and the attachment flange 141, between the inside of the chamber 10 and the flow path portion 151.

That is, when the lifting valve 153 closes the opening 152, a lower surface of the lifting valve 153 comes into contact with an upper surface of the attachment flange 141, whereby the lifting valve 153 closes the opening 152. In this case, a path of the fluid between the inside of the chamber 10 and the flow path portion 151 is blocked by a contact portion between the lower surface of the lifting valve 153 and the upper surface of the attachment flange 141. When the lifting valve 153 opens the opening 152, the lifting valve 153 moves upward, such that the lower surface of the lifting valve 153 is separated from the upper surface of the attachment flange 141. As a result, the fluid can flow between the inside of the chamber 10 and the flow path portion 151 from a portion between the lower surface of the lifting valve 153 and the upper surface of the attachment flange 141.

Therefore, when the lifting valve 153 opens the opening 152, a substantial opening of the path of the fluid flowing between the inside of the chamber 10 and the flow path portion 151 is a portion between the outer peripheral portion of the lower surface of the lifting valve 153 and the upper surface of the attachment flange 141. Since the distance d between the lower surface of the lifting valve 153 and the upper surface of the attachment flange 141 is changed by moving the lifting valve 153 in the vertical direction Z, an opening formed between the outer peripheral portion of the lower surface of the lifting valve 153 and the upper surface of the attachment flange 141 is formed as an adjustment opening 155 whose opening area is changed by moving the lifting valve 153 in the vertical direction Z.

The adjustment opening 155 is an opening through which the fluid is distributed between the chamber 10 and the opening 152, and the opening area of the adjustment opening 155 is a flow area DA through which the fluid flows between the chamber 10 and the opening 152. The fluid is flow area DA of the adjustment opening 155 is a value calculated by integrating the length of the outer peripheral portion of the lower surface of the lifting valve 153 and the distance d between the lower surface of the lifting valve 153 and the upper surface of the attachment flange 141, and is changed according to the distance d between the lifting valve 153 and the attachment flange 141. That is, the flow area DA increases as the distance d between the lifting valve 153 and the attachment flange 141, that is, the distance d between the opening 152 of the flow path portion 151 and the lifting valve 153 increases, and the flow area DA also decreases as the distance d between the opening 152 and the lifting valve 153 decreases. Therefore, the lifting valve 153 can change the flow area DA with respect to the opening 152 as the distance d between the lifting valve 153 and the opening 152 in the opening direction of the opening 152 is changed.

The lifting valve 153 capable of changing the flow area DA moves in the vertical direction Z by the servo actuator 160, and the servo actuator 160 moves the lifting valve 153 in the vertical direction Z based on a predetermined detection value. Specifically, the servo actuator 160 can move the lifting valve 153 based on a pressure in the chamber 10 detected by the vacuum gauge 180. As a result, the servo actuator 160 can change the flow area DA based on the pressure in the chamber 10 detected by the vacuum gauge 180 (see FIG. 1).

<Operation of Surface Treatment Device 1>

Figure 21:
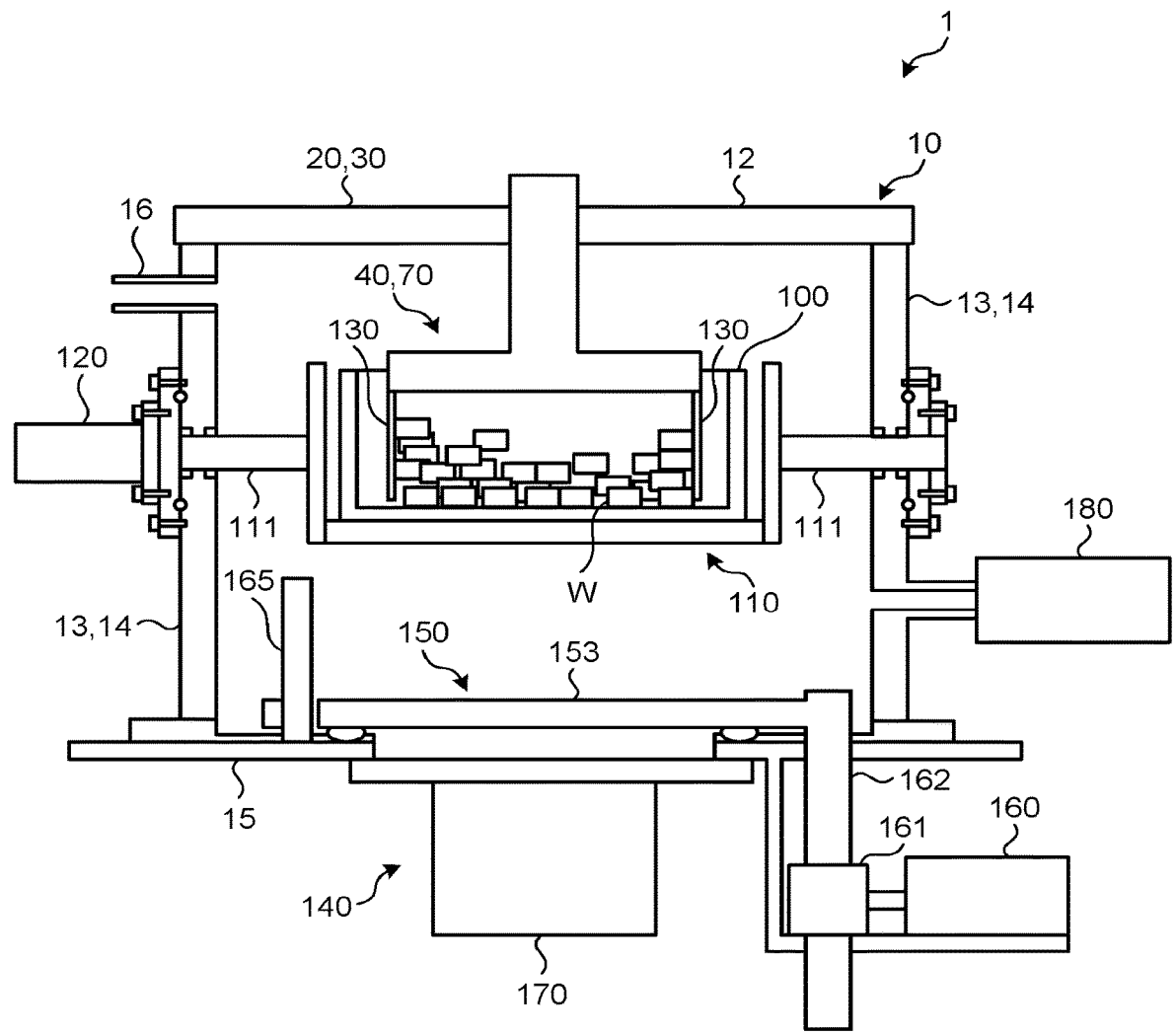
FIG. 21 is an explanatory diagram illustrating a state in which a workpiece W is housed in a housing unit illustrated in FIG. 1.

The surface treatment device 1 according to the present embodiment has the above-described configuration, and the operation thereof will be described below. FIG. 21 is an explanatory diagram illustrating a state in which the workpiece W is housed in the housing unit 100 illustrated in FIG. 1. In the surface treatment device 1 according to the embodiment, for example, the workpiece W formed of a difficult-to-plate material such as a resin material having a surface on which a metal thin film is hardly formed by normal plating is subjected to surface treatment so that the metal thin film is easily formed on the surface by plating. The workpiece W to be subjected to the surface treatment by the surface treatment device 1 according to the present embodiment is assumed to be a member having a relatively small size, and the surface treatment device 1 is suitable for collectively performing the surface treatment on a large number of the workpieces W having a small size.

Note that the workpiece W to be subjected to the surface treatment by the surface treatment device 1 is a member having a size larger than multiple holes formed in the workpiece holding wall 101 of the housing unit 100 and not passing through the holes formed in the workpiece holding wall 101 of the housing unit 100.

Figure 22:
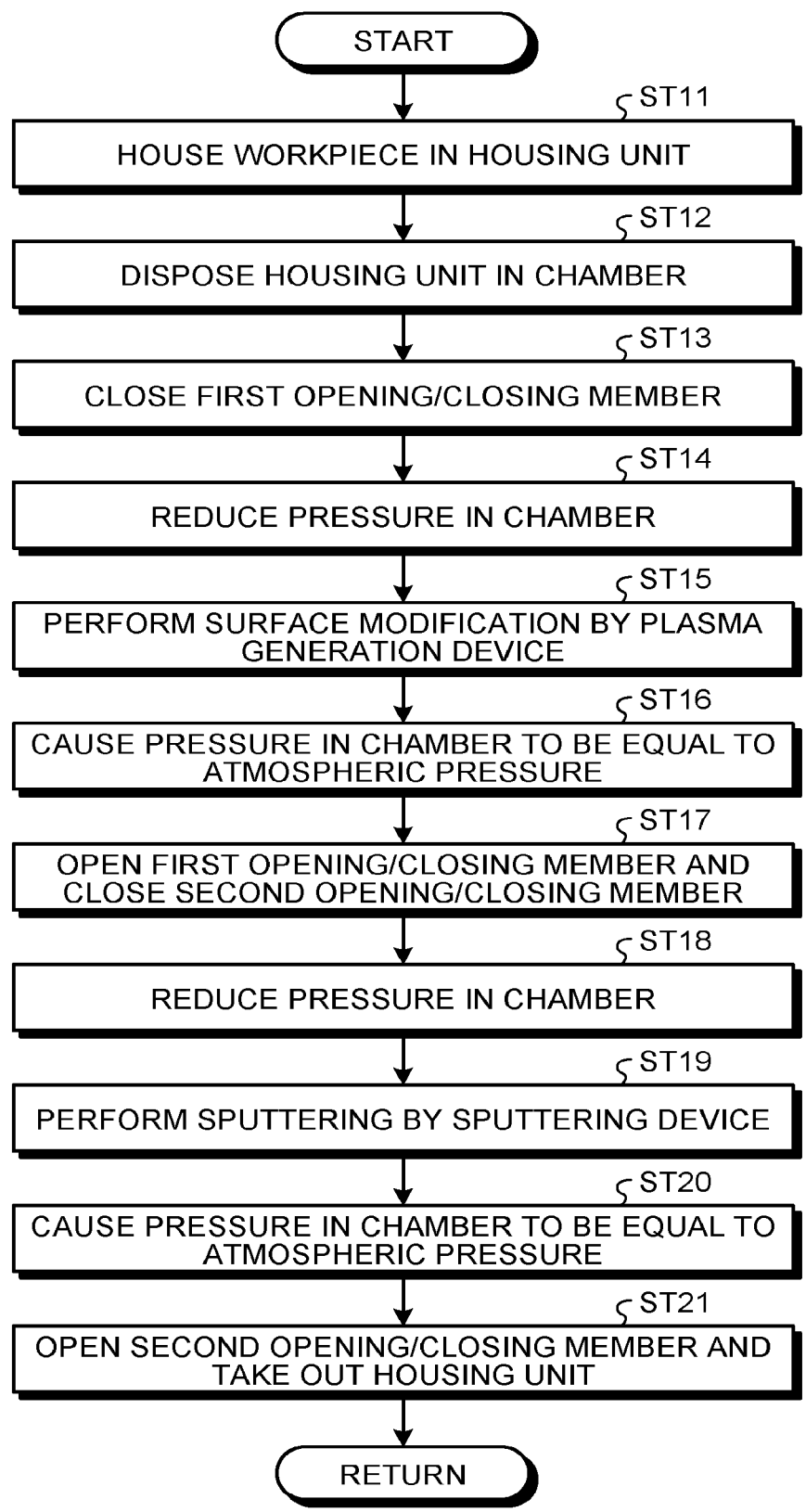
FIG. 22 is a flowchart illustrating a procedure when surface treatment of the workpiece W is performed by the surface treatment device according to the embodiment.

FIG. 22 is a flowchart illustrating a procedure when the surface treatment of the workpiece W is performed by the surface treatment device 1 according to the embodiment. When the surface treatment is performed on the workpiece W by the surface treatment device 1, the workpiece W is first housed in the housing unit 100 (Step ST11). That is, the plurality of workpieces W are inserted into the housing unit 100 through the opening 103 of the housing unit 100.

Next, the housing unit 100 housing the workpiece W is disposed in the chamber 10 (Step ST12). The housing unit 100 is disposed in the chamber 10 by mounting the housing unit 100 housing the workpiece W on the housing unit support member 110 in the chamber 10. That is, the housing unit 100 housing the workpiece W is inserted into the chamber 10 in a state in which both the first opening/closing member 20 and the second opening/closing member 30 are opened, and the housing unit 100 is attached to the housing unit support member 110. As a result, the workpiece W is housed in the chamber 10.

Once the workpiece W is housed in the chamber 10, the opening 11 of the chamber 10 is closed by the first opening/closing member 20 by rotation of the first opening/closing member 20 around the hinge portion 21 (Step ST13). As a result, a part of the plasma generation device 40 attached to the first opening/closing member 20 is positioned in the chamber 10 (see FIGS. 3 and 9). In this case, at least the plate-shaped conductor portions 51 and 52 supported by the support plate 50 of the plasma generation device 40 are positioned in the chamber 10, and the plate-shaped conductor portions 51 and 52 are inserted into the housing unit 100 through the opening 103 of the housing unit 100 disposed in the chamber 10. As a result, the plate-shaped conductor portions 51 and 52 of the plasma generation device 40 are positioned above the workpiece W housed in the housing unit 100 and relatively near the workpiece W.

Here, the pair of device-side correction plates 131, which are the correction plates 130 that limit the range in which the workpiece W is disposed, are attached to the plasma generation device 40. Since the device-side correction plates 131 are disposed below the plate-shaped conductor portions 51 and 52 of the plasma generation device 40, the device-side correction plates 131 are also inserted into the housing unit 100 when the plate-shaped conductor portions 51 and 52 are inserted into the housing unit 100 through the opening 103 of the housing unit 100. As a result, the workpiece W housed in the housing unit 100 is positioned between the pair of device-side correction plates 131 positioned in the housing unit 100.

When the housing unit 100 housing the workpiece W is disposed in the chamber 10 and the plasma generation device 40 is positioned in the chamber 10 by closing the first opening/closing member 20, the pressure in the chamber 10 is reduced by the pump unit 140 (Step ST14). At this time, a path of the gas inflow portion 16 through which the gas used for sputtering flows into the chamber 10 is closed, such that the gas does not flow from the gas inflow portion 16. When the pressure in the chamber 10 is reduced by the pump unit 140, as the turbo molecular pump 170 is operated, the gas in the chamber 10, which is the fluid sucked by the turbo molecular pump 170, is sucked by the turbo molecular pump 170 and discharged to the outside of the chamber 10. In addition, the pump unit 140 adjusts the flow rate of the gas flowing from the inside of the chamber 10 toward the turbo molecular pump 170 by operating the flow rate adjustment valve 150 in a state in which the gas in the chamber 10 is sucked by the turbo molecular pump 170. That is, the pump unit 140 adjusts the flow rate of the gas flowing from the inside of the chamber 10 toward the turbo molecular pump 170 by the suction amount of the turbo molecular pump 170 and the opening degree of the flow rate adjustment valve 150. At this time, the flow rate is adjusted to some extent by adjusting the rotational speed of the turbo molecular pump 170, and the flow rate is finely adjusted by adjusting the opening degree of the flow rate adjustment valve 150. As a result, the pressure in the chamber 10 is adjusted.

Specifically, when the pump unit 140 is in operation, the gas which is the fluid in the chamber 10 flows toward the turbo molecular pump 170 by a suction force of the turbo molecular pump 170 through the flow path portion 151 (see FIG. 20) formed in the flow rate adjustment valve 150. The flow rate adjustment valve 150 adjusts the flow rate of the gas flowing from the inside of the chamber 10 toward the flow path portion 151 by moving the lifting valve 153 in the vertical direction Z by the servo actuator 160 to change the distance d from the opening 152 of the flow path portion 151. That is, when the gas in the chamber 10 flows from the inside of the chamber 10 to the flow path portion 151, the gas flows from the inside of the chamber 10 to the flow path portion 151 through the adjustment opening 155 (see FIG. 20) which is the opening formed between the outer peripheral portion of the lower surface of the lifting valve 153 and the upper surface of the attachment flange 141. The adjustment opening 155 through which the gas flowing from the inside of the chamber 10 toward the flow path portion 151 passes can change the flow area DA, which is the opening area of the adjustment opening 155, by moving the lifting valve 153 in the vertical direction Z and changing the distance d between the lifting valve 153 and the attachment flange 141.

Figure 23:
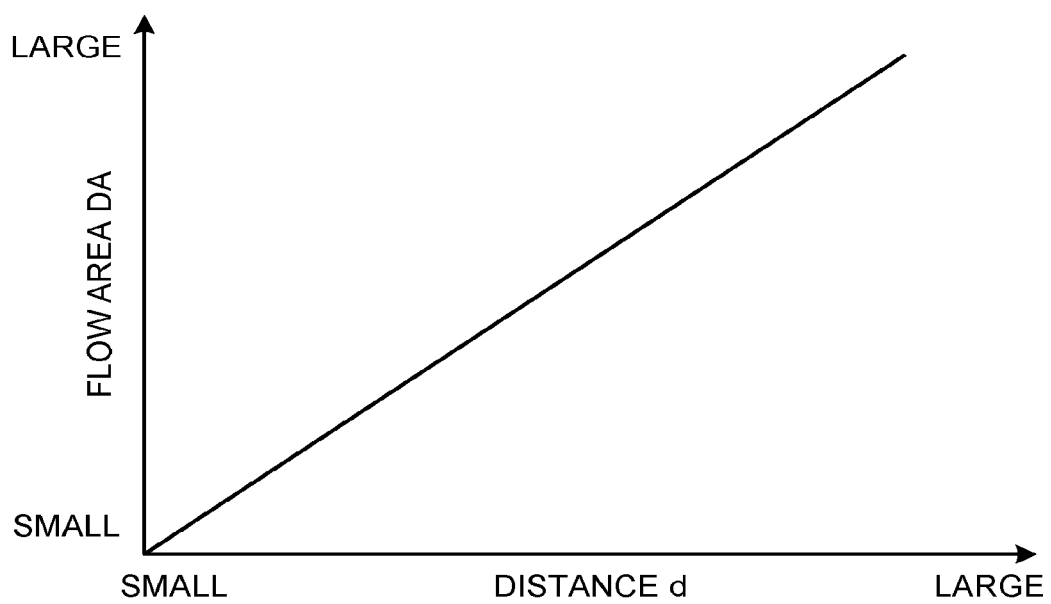
FIG. 23 is an explanatory diagram illustrating a relationship between a distance between the lifting valve and an attachment flange and a flow area.

FIG. 23 is an explanatory diagram illustrating a relationship between the distance d between the lifting valve 153 and the attachment flange 141 and the flow area DA. The flow area DA of the adjustment opening 155 is a value calculated by integrating the length of the outer peripheral portion of the lower surface of the lifting valve 153 and the distance d between the lower surface of the lifting valve 153 and the upper surface of the attachment flange 141. Therefore, the flow area DA is proportional to the distance d between the lifting valve 153 and the attachment flange 141. Therefore, the flow rate adjustment valve 150 can change the flow area DA in proportion to the movement amount of the lifting valve 153 in the vertical direction Z, and can adjust the flow rate of the gas flowing from the inside of the chamber 10 toward the flow path portion 151 by moving the lifting valve 153 in the vertical direction Z to change the flow area DA.

The lifting valve 153 that is moved in the vertical direction Z when adjusting the flow rate of the gas flowing from the inside of the chamber 10 toward the flow path portion 151 moves in the vertical direction Z by the driving force generated by the servo actuator 160. That is, when the lifting valve 153 is moved, the driving force generated by the servo actuator 160 is transmitted to the lifting shaft 162 via the worm jack 161, such that the lifting shaft 162 is moved in the vertical direction Z, and the movement of the lifting shaft 162 in the vertical direction Z is transmitted to the lifting valve 153 by the connection member 163, and as a result, the lifting valve 153 also moves in the vertical direction Z. Therefore, the flow rate adjustment valve 150 can change the flow area DA by moving the lifting valve 153 by the driving force generated by the servo actuator 160.

When the lifting valve 153 is moved by the driving force generated by the servo actuator 160, the servo actuator 160 is operated based on a detection value of the pressure in the chamber 10 detected by the vacuum gauge 180. For example, in a case where the pressure in the chamber 10 detected by the vacuum gauge 180 is higher than a set pressure, the servo actuator 160 is operated so as to lift the lifting valve 153. As a result, since the lifting valve 153 moves upward by the driving force of the servo actuator 160, the flow area DA increases, and a large amount of gas in the chamber 10 flows from the opening 152 of the flow path portion 151 into the flow path portion 151 through the adjustment opening 155 having a large flow area DA by the suction force of the turbo molecular pump 170. Therefore, the pressure in the chamber 10 is rapidly reduced.

On the other hand, in a case where the pressure in the chamber 10 detected by the vacuum gauge 180 is close to the set pressure or lower than the set pressure, the servo actuator 160 is operated so as to lower the lifting valve 153. As a result, since the lifting valve 153 moves downward by the driving force of the servo actuator 160, the flow area DA decreases, and a small amount of gas in the chamber 10 flows from the opening 152 of the flow path portion 151 into the flow path portion 151 through the adjustment opening 155 having a small flow area DA by the suction force of the turbo molecular pump 170. Therefore, the pressure in the chamber 10 is reduced slowly or is maintained.

At this time, in the flow rate adjustment valve 150, since the flow area DA of the adjustment opening 155 is changed in proportion to the distance d between the lifting valve 153 and the attachment flange 141, the flow rate of the gas flowing from the inside of the chamber 10 toward the flow path portion 151 can be easily adjusted by adjusting the distance d between the lifting valve 153 and the attachment flange 141. Therefore, by adjusting the distance d between the lifting valve 153 and the attachment flange 141 based on the pressure in the chamber 10 detected by the vacuum gauge 180, the pressure in the chamber 10 can be easily maintained at a constant pressure, for example.

The pump unit 140 adjusts the flow area DA of the adjustment opening 155 by moving the lifting valve 153 in the vertical direction Z based on the pressure in the chamber 10 detected by the vacuum gauge 180 as described above, and adjusts the flow rate of the gas flowing from the inside of the chamber 10 toward the flow path portion 151 to reduce the pressure in the chamber 10 to a predetermined set pressure. Note that the set pressure in this case is a pressure set as a pressure suitable for generating plasma in the plasma generation device 40 and performing surface modification on the workpiece W, and is, for example, a pressure of about 10 Pa to 300 Pa. The pump unit 140 adjusts the pressure in the chamber 10 to a pressure of about 10 Pa to 300 Pa according to the set pressure, thereby bringing the inside of the chamber 10 from a low vacuum state to a medium vacuum state.

After the pressure in the chamber 10 is reduced to the set pressure, surface modification is performed on the workpiece W by the plasma generation device 40 (Step ST15). When the surface modification is performed by the plasma generation device 40, while the plasma generation gas is supplied to the gas introduction portion 57 (see FIGS. 5 and 6), the gap portion 56 between the parallel plate type plate-shaped conductor portions 51 and 52 (see FIGS. 5 and 6) is brought into a high frequency discharge state, and plasma is generated. The supply of the plasma generation gas to the gas introduction portion 57 is performed by supplying the plasma generation gas from the gas supply portion 44 to the gas flow path 42 and discharging the plasma generation gas to the gas introduction portion 57 through the gas supply hole 43 formed on the one end side of the gas flow path 42. Further, when the gap portion 56 between the plate-shaped conductor portions 51 and 52 is brought into the high frequency discharge state, the radio frequency power supply 61 is operated. In the gap portion 56, since the plasma generation gas supplied to the gas introduction portion 57 flows through the through hole 54 formed in the plate-shaped conductor portion 52, the plasma generation gas flowing in the gap portion 56 is turned into plasma in the gap portion 56 in the high frequency discharge state. That is, since the pressure in the chamber 10 is reduced to a pressure suitable for generating plasma by the pump unit 140, as the gap portion 56 is brought into the high frequency discharge state while causing the plasma generation gas to flow to the gap portion 56, plasma is efficiently generated in the gap portion 56.

In the gap portion 56 between the plate-shaped conductor portions 51 and 52, plasma is generated in this manner. However, the plasma generation gas is continuously supplied to the gas introduction portion 57, and the plasma generation gas continues to flow to the gap portion 56 through the through hole 54 formed in the plate-shaped conductor portion 52. Therefore, plasma is continuously generated in the gap portion 56. Therefore, the plasma generated in the gap portion 56 passes through the through hole 53 formed in the plate-shaped conductor portion 51 and flows out from the gap portion 56 toward the side opposite to the side where the plate-shaped conductor portion 52 is positioned. That is, the plasma generated in the gap portion 56 flows out to the lower side in the vertical direction Z through the through hole 53 of the plate-shaped conductor portion 51.

At this time, the diameter of the through hole 53 of the plate-shaped conductor portion 51 is smaller than the diameter of the through hole 54 formed in the plate-shaped conductor portion 52. Therefore, the plasma gas, which is the gas converted into plasma in the gap portion 56, flows out from the through hole 53 to the lower side in the vertical direction Z at a relatively high flow velocity. Since the workpiece W housed in the housing unit 100 is positioned below the plate-shaped conductor portion 51 in the vertical direction Z, the plasma gas flowing out from the through hole 53 of the plate-shaped conductor portion 51 is blown to the workpiece W housed in the housing unit 100. The workpiece W is subjected to surface modification using the plasma generated by the plasma generation device 40 as described above. That is, the workpiece W is subjected to surface treatment using plasma.

Specifically, the surface treatment performed using plasma is surface roughening in which ions in the plasma gas collide with the workpiece W to roughen the surface of the workpiece W. Examples of other surface treatment performed using plasma include cleaning of the surface of the workpiece W using plasma and generation of a hydrophilic functional group on the surface of the workpiece W using plasma, as surface treatment performed on the workpiece W using plasma. These surface treatments performed by using the plasma generated by the plasma generation device 40 may be collectively referred to as surface modification in the present embodiment.

Here, the pair of device-side correction plates 131, which are the correction plates 130 that limit the range in which the workpiece W is disposed, are attached to the plasma generation device 40. Therefore, the plasma gas flowing out from the through hole 53 of the plate-shaped conductor portion 51 flows between the pair of device-side correction plates 131. Since the workpiece W housed in the housing unit 100 is positioned between the pair of device-side correction plates 131, the plasma gas flows between the pair of device-side correction plates 131, such that the plasma gas hardly flows in a direction other than a direction toward the side where the workpiece W is positioned, and a large amount of plasma gas flows toward the workpiece W. As a result, most of the plasma gas flowing out from the through hole 53 of the plate-shaped conductor portion 51 flows toward the workpiece W, and the workpiece W is efficiently subjected to surface treatment by using the plasma gas.

As described above, when the surface treatment is performed on the workpiece W by the plasma generation device 40, the surface treatment is performed while swinging the housing unit 100. The housing unit 100 swings by driving the servomotor 120 which is the swinging means for swinging the housing unit 100. When the servomotor 120 is driven when swinging the housing unit 100, the driving force generated by the servomotor 120 is transmitted from the output shaft 121 of the servomotor 120 to the housing unit support member 110 via the drive shaft 125. The housing unit support member 110 to which the driving force from the servomotor 120 is transmitted swings around the swing shafts 111 of the housing unit support member 110 including the drive shaft 125 and the support shaft 116. As a result, the housing unit 100 supported by the housing unit support member 110 also swings integrally with the housing unit support member 110. That is, the housing unit 100 swings in a reciprocating manner in the swing direction around the swing shafts 111 integrally with the housing unit support member 110 within a range of the swing angle at which the housing unit support member 110 can swing around the swing shafts 111.

When the housing unit 100 swings, as the housing unit 100 swings in a reciprocating manner in the swing direction, an inertial force is generated on the workpiece W housed in the housing unit 100. The workpiece W housed in the housing unit 100 moves in the housing unit 100 by the inertial force, or the workpieces W collide with each other and turn over.

Note that, in a case of swinging the housing unit 100 by the driving force generated by the servomotor 120, it is preferable to include an operation of rapidly changing the speed or acceleration. By rapidly changing the swing speed or acceleration of the housing unit 100, the workpiece W can easily move or turn over inside the housing unit 100.

The plasma gas blown from the plasma generation device 40 to the workpiece W housed in the housing unit 100 reaches the entire surface of each workpiece W as the workpiece W moves or turns over inside the housing unit 100 by the swinging of the housing unit 100. That is, the entire surface of the workpiece W housed in the housing unit 100 is uniformly exposed to the plasma by the swinging of the housing unit 100. As a result, the entire surfaces of the plurality of workpieces W housed in the housing unit 100 are subjected to surface treatment using the plasma, and even in a case where the workpiece W has a complicated shape, the surface treatment is uniformly applied to the entire surface of the workpiece W having the complicated shape.

When the surface modification is performed by the plasma generation device 40 for a predetermined time, the generation of the plasma in the plasma generation device 40 is stopped, and the housing unit support member 110 is also stopped at the neutral position. When the generation of the plasma in the plasma generation device 40 is stopped and the housing unit support member 110 is also stopped, the pressure in the chamber 10 is made equal to the atmospheric pressure (Step ST16). When the pressure in the chamber 10 is made equal to the atmospheric pressure, the pump unit 140 is stopped, and a pressure adjustment valve (not illustrated) installed in the chamber 10 is opened to take air around the chamber 10 into the chamber 10. As a result, the pressure in the chamber 10 that has been reduced is increased, and the pressure in the chamber 10 is made equal to the atmospheric pressure.

When the pressure in the chamber 10 is adjusted to be equal to the atmospheric pressure, the first opening/closing member 20 is opened and the second opening/closing member 30 is closed (Step ST17). Since the pressure in the chamber 10 is substantially equal to the atmospheric pressure outside the chamber 10, the first opening/closing member 20 can be easily opened by rotating around the hinge portion 21. Once the first opening/closing member 20 is opened, the second opening/closing member 30 attached at a position different from the first opening/closing member 20 in the vicinity of the opening 11 of the chamber 10 is closed.

When the second opening/closing member 30 is closed, similarly to the first opening/closing member 20, the opening 11 of the chamber 10 is closed by the second opening/closing member 30 by rotating the second opening/closing member 30 around the hinge portion 31. As a result, a part of the sputtering device 70 attached to the second opening/closing member 30 is positioned in the chamber 10 (see FIGS. 4 and 10). In this case, at least the target 84 supported by the support plate 80 of the sputtering device 70 is positioned in the chamber 10, and the target 84 is inserted into the housing unit 100 through the opening 103 of the housing unit 100 disposed in the chamber 10. As a result, the target 84 of the sputtering device 70 is positioned above the workpiece W housed in the housing unit 100 and relatively near the workpiece W.

At this time, a pair of device-side correction plates 131, which are the correction plates 130 that limit the range in which the workpiece W is disposed, are attached to the sputtering device 70, similarly to the plasma generation device 40. Since the device-side correction plates 131 are disposed below the target 84 of the sputtering device 70, the device-side correction plates 131 are also inserted into the housing unit 100 when the target 84 is inserted into the housing unit 100 through the opening 103 of the housing unit 100. As a result, even in a case where the second opening/closing member 30 is closed, the workpiece W housed in the housing unit 100 is positioned between the pair of device-side correction plates 131 positioned in the housing unit 100 as in a case where the first opening/closing member 20 is closed.

When the sputtering device 70 is positioned in the chamber 10 by closing the second opening/closing member 30, the pressure in the chamber 10 is reduced by the pump unit 140 (Step ST18). The pressure in the chamber 10 is reduced in the same manner as in a case of reducing the pressure (Step ST14) by using the pump unit 140 in a state in which the plasma generation device 40 is positioned in the chamber 10 by closing the first opening/closing member 20. That is, the pressure in the chamber 10 is reduced to a set pressure suitable for performing sputtering on the workpiece W by the sputtering device 70. As a result, the inside of the chamber 10 is brought from the medium vacuum state to the low vacuum state according to the set pressure.

After the pressure in the chamber 10 is reduced to the set pressure, the sputtering device 70 performs sputtering on the workpiece W (Step ST19). When the sputtering device 70 performs sputtering, a gas used for sputtering flows into the chamber 10 from the gas inflow portion 16 disposed in the chamber 10, a magnetic field is generated by the magnet 81 of the sputtering device 70 to ionize the gas flowing in from the gas inflow portion 16, and ions collide with the target 84, thereby ejecting the particles of the target 84. At this time, since the pressure in the chamber 10 is reduced to a pressure suitable for performing sputtering by the pump unit 140, the gas used for sputtering flows into the chamber 10 from the gas inflow portion 16 and the magnetic field is generated by the magnet 81, such that the gas flowing in from the gas inflow portion 16 is efficiently ionized in the vicinity of the target 84 of the sputtering device 70.

In the present embodiment, since copper is used for the target 84, when ions of the gas ionized in the vicinity of the target 84 collide with the target 84, particles of copper are ejected from the target 84. By causing the ions to collide with the target 84, the particles ejected from the target 84 are directed toward the lower side opposite to the side where the magnet 81 is positioned in the vertical direction Z. Since the workpiece W housed in the housing unit 100 is positioned below the target 84 in the vertical direction Z, the particles ejected from the target 84 move toward the workpiece W housed in the housing unit 100, adhere to the workpiece W, and are accumulated on the surface of the workpiece W. As a result, a thin film is formed on the surface of the workpiece W by a substance that forms the target 84, that is, a copper thin film is formed on the surface of the workpiece W.

At this time, since the surface of the workpiece W is subjected to surface modification by the plasma generation device 40, when the sputtering device 70 forms a film on the surface of the workpiece W by using the substance that forms the target 84, the degree of adhesion of the thin film to the surface of the workpiece W can be increased. That is, since the sputtering device 70 forms a film on the surface of the workpiece W subjected to the surface modification by sputtering, a thin film can be formed on the surface of the workpiece W with a high degree of adhesion.

Here, the pair of device-side correction plates 131, which are the correction plates 130 that limit the range in which the workpiece W is disposed, are attached to the sputtering device 70. Therefore, the particles ejected from the target 84 pass between the pair of device-side correction plates 131. Since the workpiece W housed in the housing unit 100 is positioned between the pair of device-side correction plates 131, the particles ejected from the target 84 pass between the pair of device-side correction plates 131, such that the particles ejected from the target 84 do not move much in a direction other than a direction toward the position of the workpiece W, and many particles move from the target 84 toward the workpiece W. As a result, most of the particles ejected from the target 84 are directed to the workpiece W, and a thin film is efficiently formed on the surface of the workpiece W by the particles.

In a case of performing sputtering by the sputtering device 70 as described above, similarly to a case of performing surface modification on the workpiece W by the plasma generation device 40, the sputtering is performed while swinging the housing unit 100. That is, the housing unit support member 110 on which the housing unit 100 is mounted swings around the swing shafts 111 by the driving force generated by the servomotor 120. As a result, the housing unit 100 in which the workpiece W is housed swings around the swing shafts 111.

When swinging the housing unit 100 while performing sputtering by the sputtering device 70, it is preferable to include an operation of rapidly changing the speed or acceleration similarly to a case of swinging the housing unit 100 while performing surface modification by the plasma generation device 40. By rapidly changing the swing speed or acceleration of the housing unit 100, the workpiece W can easily move or turn over inside the housing unit 100.

The particles ejected from the target 84 and attached to the surface of the workpiece W by performing sputtering by the sputtering device 70 are attached to the entire surface of each workpiece W as the workpiece W moves or turns over in the housing unit 100 by the swinging of the housing unit 100. That is, the particles ejected from the target 84 are uniformly attached to the entire surface of the workpiece W housed in the housing unit 100 by the swinging of the housing unit 100, and a thin film formed by accumulation of the substance that forms the target 84 is formed on the entire surface of the workpiece W. As a result, the thin film formed of the substance that forms the target 84 is formed on the entire surfaces of the plurality of workpieces W housed in the housing unit 100, and even when the workpiece W has a complicated shape, the thin film is formed uniformly on the entire surface of the workpiece W having the complicated shape.

When the sputtering is performed by the sputtering device 70 for a predetermined time, the sputtering performed by the sputtering device 70 is stopped, and the housing unit support member 110 is also stopped at the neutral position. When the sputtering performed by the sputtering device 70 is stopped and the housing unit support member 110 is also stopped, the pressure in the chamber 10 is made equal to the atmospheric pressure (Step ST20). When the pressure in the chamber 10 is made equal to the atmospheric pressure, the pump unit 140 is stopped, and a pressure adjustment valve (not illustrated) installed in the chamber 10 is opened to take air around the chamber 10 into the chamber 10. As a result, the pressure in the chamber 10 that has been reduced is increased, and the pressure in the chamber 10 is made equal to the atmospheric pressure.

When the pressure in the chamber 10 is adjusted to be equal to the atmospheric pressure, the second opening/closing member 30 is opened, and the housing unit 100 is taken out (Step ST21). Since the pressure in the chamber 10 is substantially equal to the atmospheric pressure outside the chamber 10, the second opening/closing member 30 can be easily opened by rotating around the hinge portion 31. When the second opening/closing member 30 is opened, the housing unit 100 housed in the chamber 10 is taken out through the opening 11 of the chamber 10. That is, the housing unit 100 housed in the chamber 10 is detached from the housing unit support member 110 in a state in which the workpiece W is housed, and is taken out of the chamber 10. Thus, after the surface modification is performed by the plasma generation device 40, sputtering is performed by the sputtering device 70, whereby the workpiece W having a surface on which the thin film with a high degree of adhesion is formed is taken out of the chamber 10.

In the surface treatment device 1, as described above, the thin film with a high degree of adhesion is formed on the surface of the workpiece W formed of the difficult-to-plate material. The workpiece W having a surface on which the thin film is formed is subjected to plating in the subsequent step. In the plating performed in the subsequent step, for example, a method such as electrolytic plating, electroless plating, or hot dipping is used. Since these types of plating are performed on the workpiece W having a surface on which the thin film formed of the substance that forms the target 84 is formed with a high degree of adhesion, the metal thin film that covers the surface by the plating can also cover the surface of the thin film formed on the surface of the workpiece W with a high degree of adhesion.

Effects of Embodiment

The flow rate adjustment valve 150 according to the above-described embodiment includes the lifting valve 153 that can cover the entire region of the opening 152 of the flow path portion 151 in which the fluid flows to close the opening 152 and can be separated from the opening 152 to open the opening 152. In addition, the lifting valve 153 can change the distance d from the opening 152 to change the flow area DA when the fluid flows with respect to the opening 152. Furthermore, the lifting valve 153 can be moved in the opening direction of the opening 152 by the servo actuator 160 as the driving means based on a predetermined detection value, and the flow area DA can be changed by moving the lifting valve 153 in the opening direction of the opening 152. As described above, the flow area DA when the fluid flows with respect to the opening 152 is changed according to the distance d between the lifting valve 153 and the opening 152, that is, the flow area DA is proportional to the distance d between the lifting valve 153 and the opening 152. Therefore, the flow area DA when the fluid is distributed with respect to the opening 152 can be easily adjusted with high accuracy by adjusting the distance d between the lifting valve 153 and the opening 152 proportional to the flow area DA. As a result, the flow rate of the fluid can be adjusted with high accuracy.

In addition, since the shape of the lifting valve 153 when viewed in the opening direction of the opening 152, that is, the shape when viewed in the vertical direction Z is a substantially circular shape, the fluid can uniformly flow from the periphery of the lifting valve 153 with respect to the opening 152. As a result, when making the fluid flow to the opening 152 while adjusting the flow rate of the fluid, the fluid can flow without being disturbed, such that the fluid can flow more reliably with high accuracy. As a result, the flow rate of the fluid can be more reliably adjusted with high accuracy.

Further, since the pump unit 140 according to the embodiment includes the flow rate adjustment valve 150 and the turbo molecular pump 170 which is a pump for sucking the fluid flowing in the flow path portion 151, the flow rate of the fluid sucked by the turbo molecular pump 170 can be easily adjusted with high accuracy by adjusting the distance d between the opening 152 of the flow path portion 151 in which the fluid flows and the lifting valve 153. As a result, the flow rate of the fluid can be adjusted with high accuracy.

In addition, the turbo molecular pump 170 of the pump unit 140 sucks the fluid flowing in the flow path portion 151 by the rotation of the impeller 176 around the rotation axis PC, and the rotation axis PC of the turbo molecular pump 170 substantially coincides with the central axis VC of the substantially circular shape which is the shape of the lifting valve 153, such that the fluid can be efficiently sucked. Specifically, since the turbo molecular pump 170 sucks the fluid by the rotation of the impeller 176, the flow velocity of the fluid is relatively low near the rotation axis PC of the impeller 176, and the flow velocity of the fluid is high near an outer end of the impeller 176 in the radial direction around the rotation axis PC. Therefore, the fluid sucked by the turbo molecular pump 170 can suck a large amount of fluid at a high flow velocity from the vicinity of the outer peripheral portion of the lifting valve 153 formed in a substantially circular shape. As a result, even in a case where the lifting valve 153 is disposed on upstream in the suction direction when the fluid is sucked by the turbo molecular pump 170, the fluid can be efficiently sucked.

That is, since the flow rate in the vicinity of the rotation axis PC of the impeller 176 in the turbo molecular pump 170 at the time of suction of the fluid is originally not large, even in a case where the lifting valve 153 is disposed on upstream in the suction direction of the fluid in the turbo molecular pump 170, the flow rate of the fluid is not changed much in the vicinity of the rotation axis PC of the impeller 176. Therefore, the turbo molecular pump 170 above which the lifting valve 153 is disposed on upstream in the suction direction of the fluid can suck a large amount of fluid from the vicinity of the outer peripheral portion of the lifting valve 153, that is, from the vicinity of the outer end of the impeller 176 in the radial direction around the rotation axis PC without being greatly affected by the disposition of the lifting valve 153. As a result, it is possible to adjust the flow rate of the fluid with high accuracy while suppressing a decrease in efficiency at the time of sucking the fluid.

Further, in the pump unit 140, the fluid flows from the portion between the outer peripheral portion of the lifting valve 153 and the attachment flange 141 to the flow path portion 151 regardless of the distance d between the opening 152 of the flow path portion 151 and the lifting valve 153, such that the fluid can constantly flow regardless of the opening degree of the flow rate adjustment valve 150. That is, the flow rate adjustment valve 150 can suppress a change in the flow of the fluid when the opening degree of the valve is changed, like a butterfly valve or a valve that moves a valve plate in a direction intersecting the direction of the flow path. As a result, the pump unit 140 including the flow rate adjustment valve 150 can suppress a large change in the flow of the fluid in the chamber 10 according to the opening degree of the flow rate adjustment valve 150. Therefore, the pump unit 140 disposed immediately below the housing unit 100 that houses the workpiece W can suppress the disturbance of the flow of the fluid in the chamber 10 according to the opening degree of the flow rate adjustment valve 150, and can suppress the disturbance of the flow of the fluid around the workpiece W at the time of suction of the fluid in the chamber 10. As a result, the quality of the workpiece W subjected to the surface treatment by the surface treatment device 1 can be stabilized.

The surface treatment device 1 according to the embodiment includes the pump unit 140 and the chamber 10 that can house the workpiece W to be subjected to the surface treatment therein, the opening 152 of the flow path portion 151 in which the fluid flows is opened with respect to the chamber 10, and the lifting valve 153 is disposed in the chamber 10. Thus, the pump unit 140 can easily adjust the flow rate of the fluid sucked from the inside of the chamber 10 by the turbo molecular pump 170 with high accuracy by adjusting the distance d between the lifting valve 153 of the flow rate adjustment valve 150 and the opening 152. In addition, since the servo actuator 160 that moves the lifting valve 153 moves the lifting valve 153 based on the pressure in the chamber 10, the flow rate of the fluid in the chamber 10 sucked by the turbo molecular pump 170 can be easily adjusted with high accuracy based on the pressure in the chamber 10. As a result, the flow rate of the fluid can be adjusted with high accuracy.

[Modifications]

<Modification of Correction Plate 130>

Figure 24:
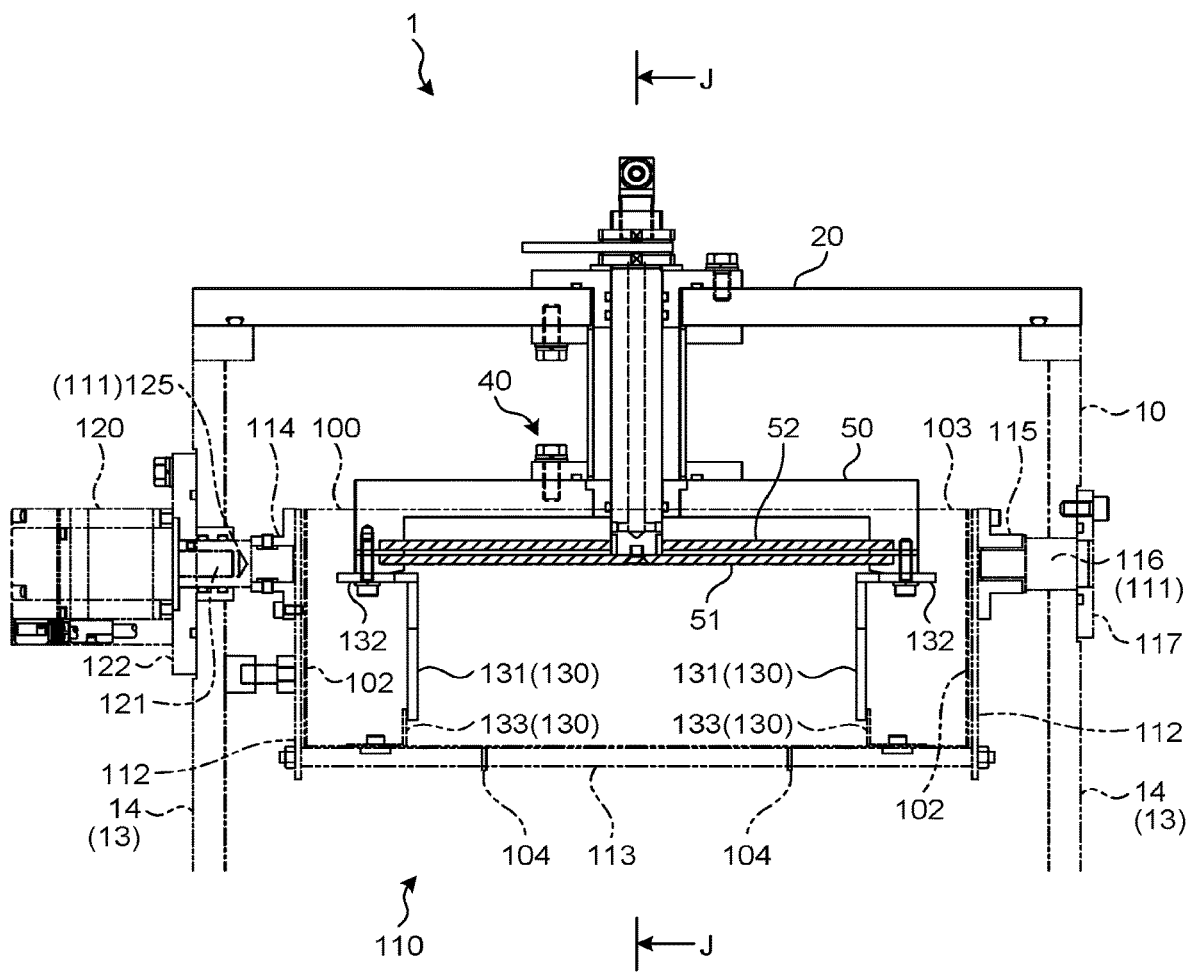
FIG. 24 illustrates a modification of the surface treatment device according to the embodiment, and is an explanatory diagram illustrating the correction plate in a state in which the plasma generation device is positioned in the chamber.
Figure 24:
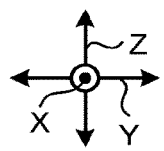
Figure 25:
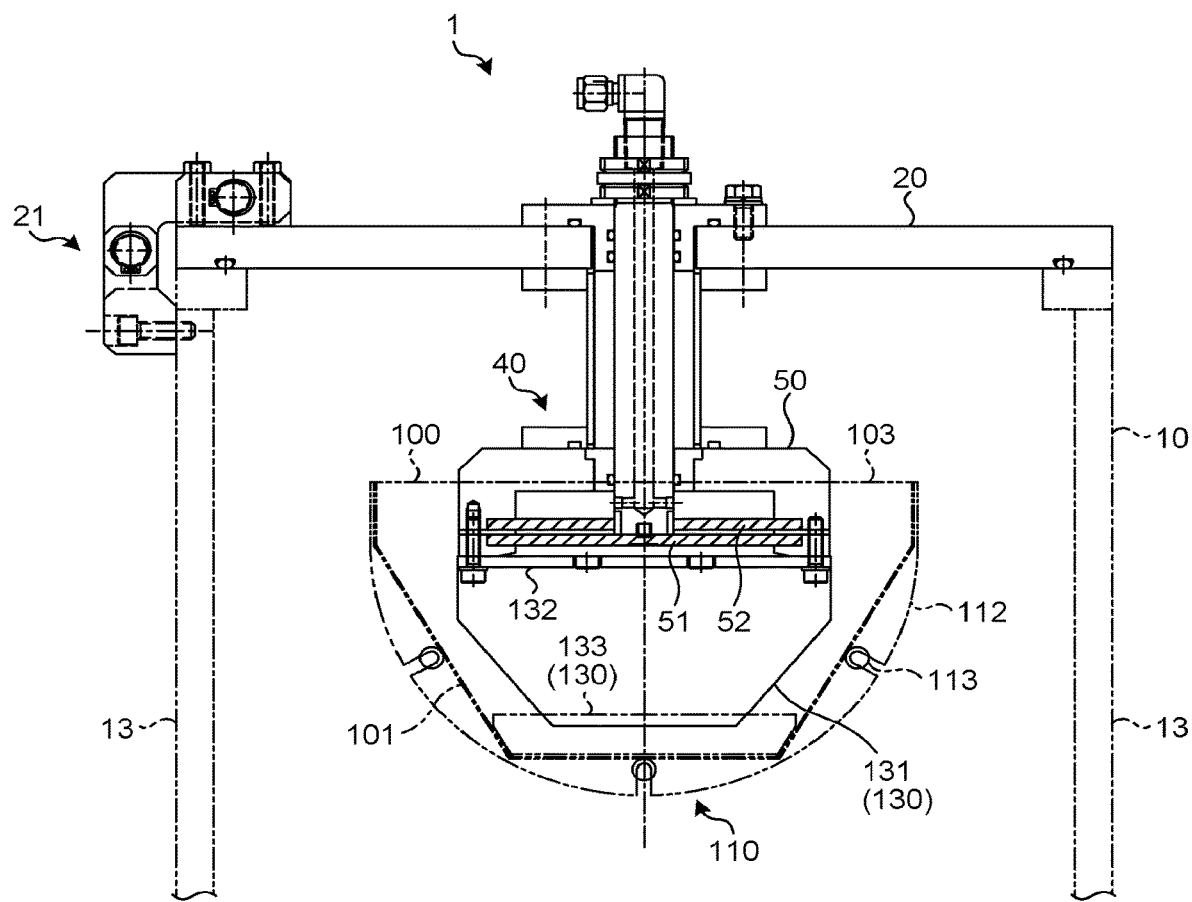
FIG. 25 is a cross-sectional view taken along line J-J of FIG. 24.

Note that, in the surface treatment device 1 according to the above-described embodiment, the device-side correction plates 131 attached to the plasma generation device 40 and the sputtering device 70 are used as the correction plates 130 that limit the range in which the workpiece W is disposed, but a plate other than the device-side correction plate 131 may be used as the correction plate 130. FIG. 24 illustrates a modification of the surface treatment device 1 according to the embodiment, and is an explanatory diagram illustrating the correction plate 130 in a state in which the plasma generation device 40 is positioned in the chamber 10. FIG. 25 is a cross-sectional view taken along line J-J of FIG. 24. As illustrated in FIGS. 24 and 25, the correction plate 130 may include a housing-unit-side correction plate 133 attached to the housing unit 100, in addition to the device-side correction plate 131 attached to the plasma generation device 40 or the sputtering device 70 (see FIG. 10). The housing-unit-side correction plate 133 is the correction plate 130 attached to the bottom portion of the housing unit 100 inside the housing unit 100.

Note that, in a description of the housing-unit-side correction plate 133 with reference to FIGS. 24 and 25, a relative relationship between the device-side correction plate 131 attached to the plasma generation device 40 and the housing-unit-side correction plate 133 will be described, and the same applies to a relative relationship between the device-side correction plate 131 attached to the sputtering device 70 and the housing-unit-side correction plate 133.

A pair of housing-unit-side correction plates 133 are disposed inside the housing unit 100, and the pair of housing-unit-side correction plates 133 are spaced apart from each other in the length direction Y. In addition, an interval between the pair of housing-unit-side correction plates 133 in the length direction Y is slightly larger than the interval between the pair of device-side correction plates 131.

In addition, the housing-unit-side correction plates 133 are formed at a substantially constant height in the vertical direction Z and extend in the width direction X. The height of the housing-unit-side correction plate 133 is a height at which a position of an upper end of the housing-unit-side correction plate 133 is positioned above a position of a lower end of the device-side correction plate 131 when the plasma generation device 40 is positioned in the chamber 10. Therefore, in a state in which the plasma generation device 40 is positioned in the chamber 10, portions in the vicinity of the upper ends of the pair of housing-unit-side correction plates 133 overlap portions in the vicinity of the lower ends of the device-side correction plates 131 in the vertical direction Z in a state in which the pair of device-side correction plates 131 are sandwiched between the housing-unit-side correction plates 133 in the length direction Y.

The housing unit 100 to which the housing-unit-side correction plates 133 are attached can swing integrally with the housing unit support member 110 around the swing shafts 111, but the housing-unit-side correction plates 133 can overlap the device-side correction plates 131 regardless of the swing angle of the housing unit 100. That is, the housing-unit-side correction plate 133 is disposed so as to be able to continuously overlap the device-side correction plate 131 regardless of a change in an angle relative to the device-side correction plate 131 due to the swinging of the housing unit 100.

As described above, in a case where the housing-unit-side correction plates 133 are attached to the housing unit 100, when the workpiece W is housed in the housing unit 100 in order to perform the surface treatment on the workpiece W, the workpiece W can be housed between the pair of housing-unit-side correction plates 133 in the housing unit 100. In a case where the first opening/closing member 20 or the second opening/closing member 30 is closed in this state, the pair of device-side correction plates 131 enter between the pair of housing-unit-side correction plates 133 arranged in the housing unit 100.

Specifically, the interval between the pair of device-side correction plates 131 is slightly smaller than the interval between the pair of housing-unit-side correction plates 133 disposed in the housing unit 100. Therefore, when the first opening/closing member 20 or the second opening/closing member 30 is closed, the pair of device-side correction plates 131 enter between the pair of housing-unit-side correction plates 133. As a result, the plurality of workpieces W housed in the housing unit 100 and positioned between the pair of housing-unit-side correction plates 133 enter between the pair of device-side correction plates 131. In other words, the pair of device-side correction plates 131 cover the workpiece W housed in the housing unit 100 from both sides in the length direction Y.

As a result, in a case where surface modification is performed by the plasma generation device 40, most of the plasma gas from the plasma generation device 40 more reliably flows toward the workpiece W through between the pair of device-side correction plates 131, and the workpiece W is efficiently subjected to the surface treatment by using the plasma gas. Similarly, in a case where sputtering is performed by the sputtering device 70, most of the particles ejected from the target 84 more reliably move toward the workpiece W through between the pair of device-side correction plates 131, and a thin film is efficiently formed on the surface of the workpiece W by using the particles. As a result, desired processing can be more reliably performed on the workpiece W.

<Modification of Pump Unit 140>

In the pump unit 140 according to the above-described embodiment, the attachment flange 141 to which the pump flange 171 of the turbo molecular pump 170 is attached is attached to the bottom portion 15 of the chamber 10 by being attached to the lower surface of the bottom portion 15 of the chamber 10. However, the pump unit 140 may be attached to the chamber 10 in other forms.

Figure 26:
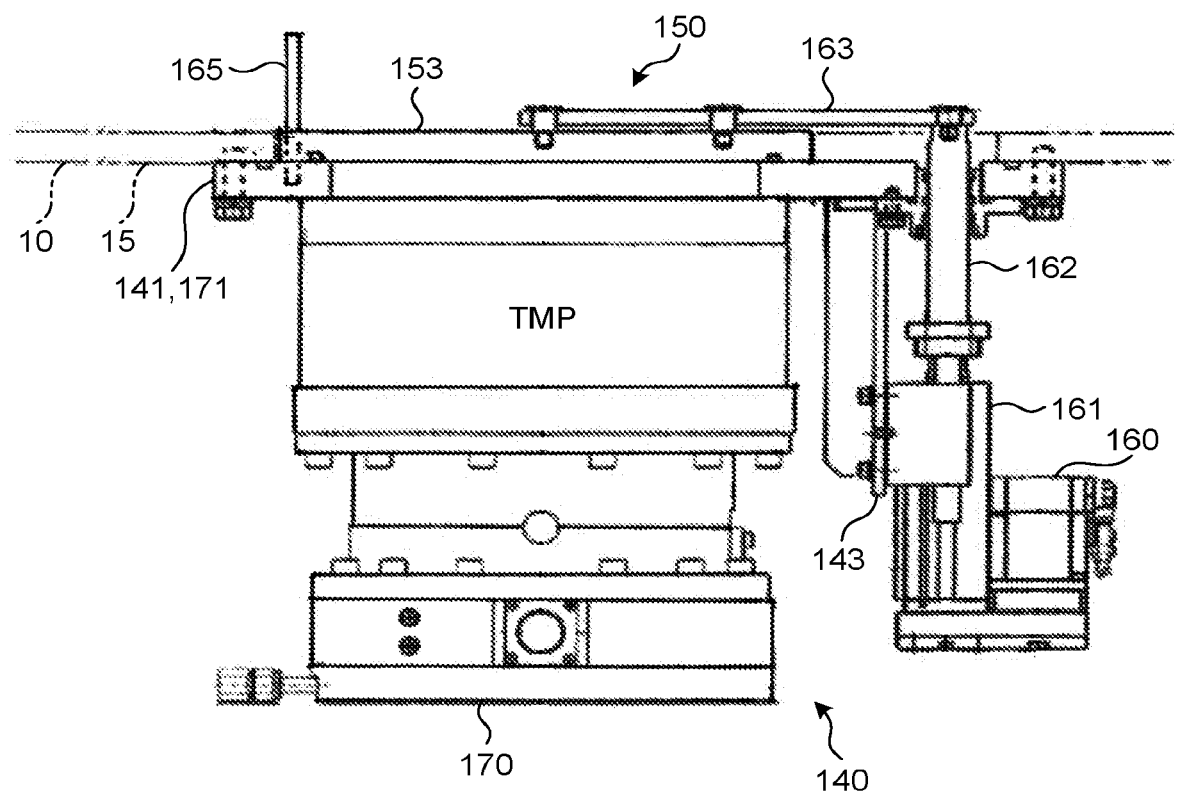
FIG. 26 illustrates a modification of the pump unit according to the embodiment, and is an explanatory diagram illustrating a case where a pump flange of a turbo molecular pump and the attachment flange are shared.
Figure 26:
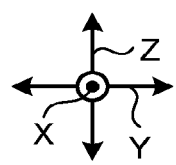

FIG. 26 illustrates a modification of the pump unit 140 according to the embodiment, and is an explanatory diagram illustrating a case where the pump flange 171 of the turbo molecular pump 170 and the attachment flange 141 are shared. In the pump unit 140, for example, as illustrated in FIG. 26, the pump flange 171 for attaching the turbo molecular pump 170 to another member and the attachment flange 141 for attaching the pump unit 140 to the chamber 10 may be shared. That is, the flow path portion 151 (see FIGS. 18 and 20) having the opening 152 (see FIGS. 18 and 20) that is opened and closed by the lifting valve 153 of the flow rate adjustment valve 150 moving in the vertical direction Z may be formed in the pump flange 171 of the turbo molecular pump 170. In this case, the driving means support portion 143 to which the servo actuator 160 is attached is attached to the pump flange 171 shared with the attachment flange 141.

When the pump flange 171 and the attachment flange 141 are shared, the valve guide 165 that guides the opening/closing operation of the lifting valve 153 is preferably provided in the pump flange 171, and the lifting valve 153 is preferably formed with a through hole which penetrates in the vertical direction Z and through which the valve guide 165 passes. By forming the pump unit 140 as described above, the flow rate adjustment valve 150 and the turbo molecular pump 170 can be integrally attached to the chamber 10, including the valve guide 165. As a result, workability at the time of assembling the surface treatment device 1 can be improved.

In addition, in the surface treatment device 1 according to the above-described embodiment, the plasma generation device 40 is used as a first treatment device disposed on the first opening/closing member 20, and the sputtering device 70 is used as a second treatment device disposed on the second opening/closing member 30. However, the first treatment device and the second treatment device may be other devices.

In addition, in the surface treatment device 1 according to the above-described embodiment, a mode in which the first treatment device and the second treatment device are provided has been described, but a third treatment device and a fourth treatment device may be further provided. In this case, the hinge portions attached to the respective different treatment devices may be disposed in the chamber 10 at appropriate intervals according to the shape of the treatment device or the chamber 10. That is, it is sufficient that a plurality of treatment devices attached to the chamber 10 via the hinge portions in an openable and closable manner can be alternately positioned in the chamber 10, and in a state in which the treatment devices are positioned outside the chamber 10, the treatment devices can be positioned outside the chamber 10 without interfering with other treatment devices.

<Experiment on Exhaust Speed with Respect to Valve Opening Degree>

Figure 27:
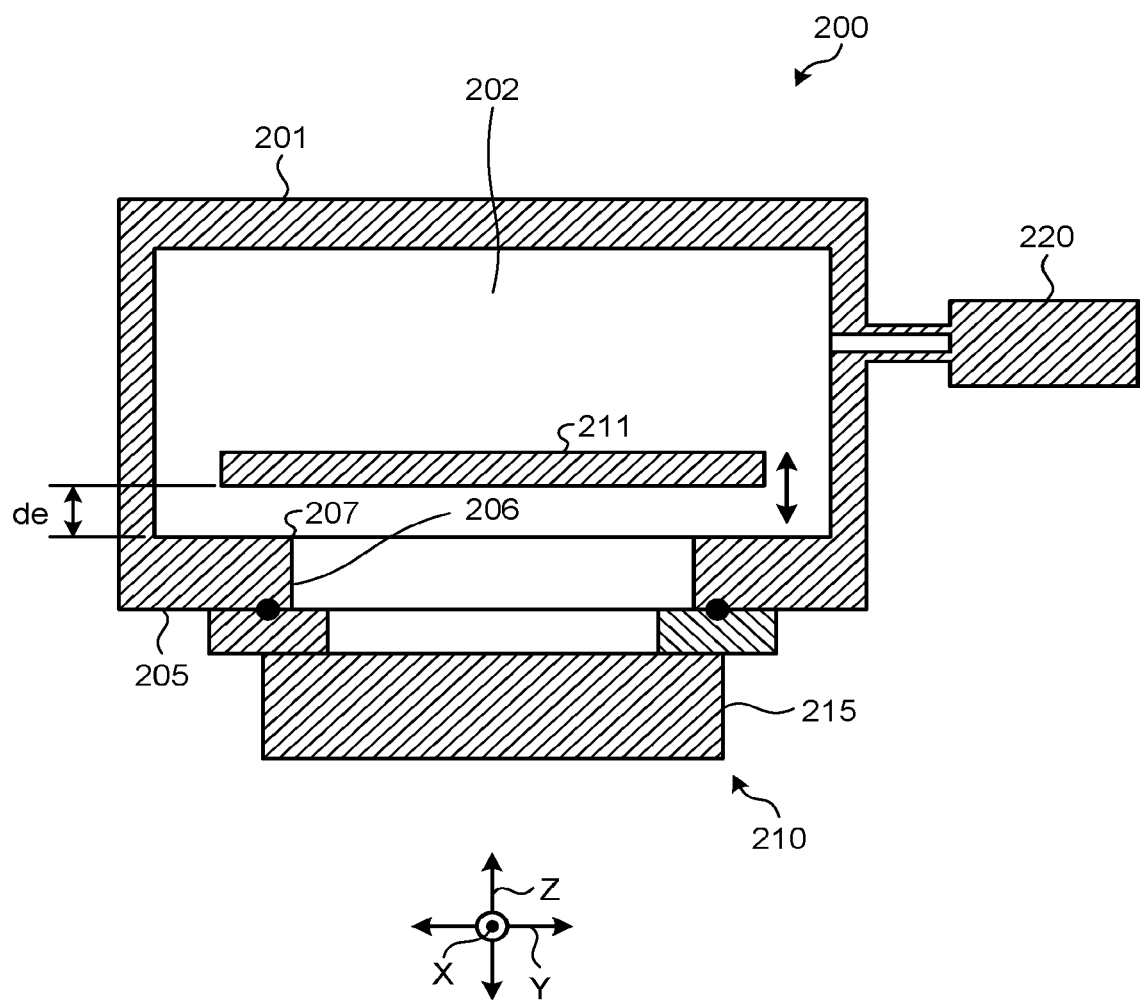
FIG. 27 is a schematic view of an experimental device used for an experiment on a relationship between a valve opening degree and an effective exhaust speed.

The inventors conducted an experiment on a relationship between a valve opening degree and an effective exhaust speed in the pump unit 140 according to the present embodiment. Next, the experiment on the relationship between the valve opening degree and the effective exhaust speed in the pump unit will be described. FIG. 27 is a schematic view of an experimental device 200 used for the experiment on the relationship between the valve opening degree and the effective exhaust speed. The experiment on the relationship between the valve opening degree and the effective exhaust speed in the pump unit was conducted using the experimental device 200 illustrated in FIG. 27. The experimental device 200 includes a main body 201 having a vacuum furnace 202 inside, a pump unit 210 disposed on a bottom portion 205 positioned at a lower end of the main body 201 in the vertical direction Z, and a pressure gauge 220 that detects a pressure of the vacuum furnace 202 of the main body 201. A flow path portion 206 in which a fluid flows is formed at the bottom portion 205 of the main body 201. The flow path portion 206 is formed as a hole penetrating through the bottom portion 205 in the vertical direction Z.

The pump unit 210 includes a lifting valve 211 disposed in the vacuum furnace 202 and a turbo molecular pump 215 attached to the lower surface side of the bottom portion 205 of the main body 201 in the vertical direction Z. In addition, similarly to the pump unit 210 according to the above-described embodiment, the pump unit 140 includes a servo actuator (not illustrated) which is a driving means for moving the lifting valve 211 in the vertical direction Z. As a result, the lifting valve 211 is movable in the vertical direction Z in the vacuum furnace 202 by a driving force transmitted from the servo actuator, and the flow path portion 206 formed at the bottom portion 205 of the main body 201 is opened and closed inside the main body 201. That is, the lifting valve 211 is positioned at one end of the flow path portion 206, and can open and close an opening 207 which is a portion opened to the vacuum furnace 202.

Figure 28:
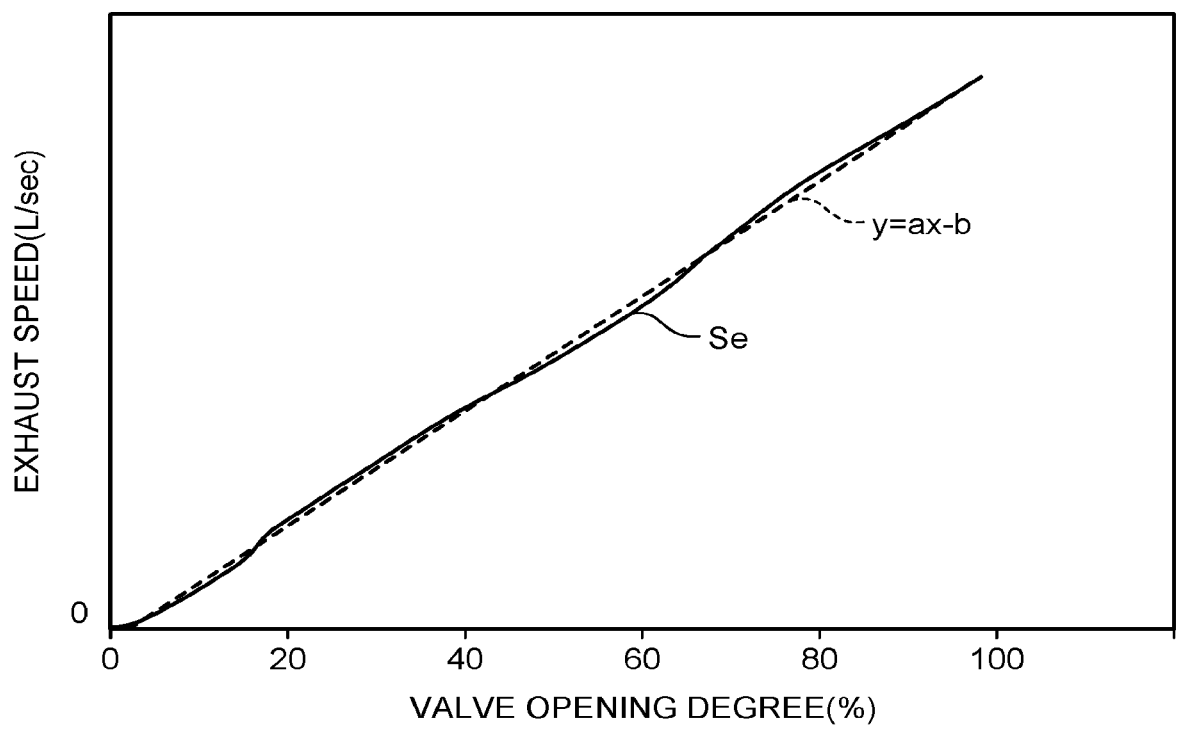
FIG. 28 is a diagram illustrating a result of the experiment on the exhaust speed with respect to the valve opening degree, the experiment being conducted using the experimental device illustrated in FIG. 27.

FIG. 28 is a diagram illustrating a result of the experiment on the exhaust speed with respect to the valve opening degree, the experiment being conducted using the experimental device 200 illustrated in FIG. 27. The experiment on the relationship between the valve opening degree and the effective exhaust speed performed using the experimental device 200 illustrated in FIG. 27 was conducted by changing the valve opening degree while exhausting gas in the vacuum furnace 202 by the pump unit 210 and measuring the exhaust speed for each valve opening degree. In this experiment, the turbo molecular pump 215 of the pump unit 210 is operated with constant rotation. In the measurement of the exhaust speed, the exhaust speed was obtained for each valve opening degree from an equilibrium pressure of the vacuum furnace 202 for each valve opening degree by changing the valve opening degree while making a certain amount of gas flow into the vacuum furnace 202.

Note that, in this experiment, the valve opening degree was indicated using a distance de between the lifting valve 211 and the bottom portion 205 in a case where the distance de between the lifting valve 211 and the bottom portion 205 in the vertical direction Z is 0% in a state in which the lifting valve 211 is brought into contact with the bottom portion 205 of the main body 201 to close the opening 207 of the flow path portion 206, and the distance de is 100% when the lifting valve 211 is moved to the uppermost side within a range where the lifting valve 211 can be moved in the vertical direction Z. In other words, the valve opening degree was indicated using the distance de between the opening 207 of the flow path portion 206 formed at the bottom portion 205 of the main body 201 and the lifting valve 211 in a movement direction of the lifting valve 211, and the minimum distance is expressed as 0% and the maximum distance is expressed as 100%.

As a result of conducting the experiment using the experimental device 200 illustrated in FIG. 27, it has been found that an exhaust speed Se is changed according to the valve opening degree as illustrated in FIG. 28. Note that, in FIG. 28, the horizontal axis represents the valve opening degree (%), and the vertical axis represents the exhaust speed (L/sec). As a result of conducting the experiment using the experimental device 200 illustrated in FIG. 27, it has been found that the exhaust speed Se is changed by approximating to a linear expression of y=ax−b, in which the exhaust speed Se is y, the valve opening degree is x, the slope is a, and the intercept is b with respect to the valve opening degree.

From this experimental result, it has been found that, in the pump unit 140 according to the above-described embodiment having the same configuration as the experimental device 200 illustrated in FIG. 27, the exhaust speed at the time of exhausting the gas in the chamber 10 from the flow path portion 151 to the outside of the chamber 10 is changed in a linear relationship with respect to the valve opening degree which is the opening degree of the lifting valve 153. Therefore, when the gas in the chamber 10 is exhausted using the pump unit 140, the exhaust speed can be controlled by open-loop control by adjusting the valve opening degree of the lifting valve 153, such that the flow rate of the fluid can be easily adjusted with high accuracy.

EXPLANATIONS OF LETTERS OR NUMERALS

1 SURFACE TREATMENT DEVICE
10 CHAMBER
11 OPENING
12 UPPER WALL
13 SIDE WALL
14 SUPPORT WALL
15 BOTTOM PORTION
16 GAS INFLOW PORTION
20 FIRST OPENING/CLOSING MEMBER
21 HINGE PORTION
30 SECOND OPENING/CLOSING MEMBER
31 HINGE PORTION
40 PLASMA GENERATION DEVICE
41 GAS SUPPLY PIPE
42 GAS FLOW PATH
43 GAS SUPPLY HOLE
44 GAS SUPPLY PORTION
45 GAS SUPPLY PIPE ATTACHMENT MEMBER
46 SUPPORT MEMBER
50 SUPPORT PLATE
50a RECESS PORTION
51 PLATE-SHAPED CONDUCTOR PORTION
52 PLATE-SHAPED CONDUCTOR PORTION
53 THROUGH HOLE
54 THROUGH HOLE
55 SPACER
56 GAP PORTION
57 GAS INTRODUCTION PORTION
58 HOLDING MEMBER
60 MB
61 RF
63 GROUND
64 MFC
70 SPUTTERING DEVICE
71 COOLING WATER PIPE
72 COOLING WATER PATH
73 WATER INLET
74 WATER OUTLET
75 COOLING WATER PIPE ATTACHMENT MEMBER
76 SUPPORT MEMBER
80 SUPPORT PLATE
81 MAGNET
82 COOLING JACKET
83 INSULATING MATERIAL
84 TARGET
85 HOLDING MEMBER
100 HOUSING UNIT
101 WORKPIECE HOLDING WALL
102 SIDE WALL
103 OPENING
104 ATTACHMENT PLATE
110 HOUSING UNIT SUPPORT MEMBER
111 SWING SHAFT
112 SIDE PLATE
113 ATTACHMENT MEMBER
114 SWINGING MEANS SHAFT CONNECTION PORTION
115 SUPPORT SHAFT CONNECTION PORTION
116 SUPPORT SHAFT
117 SUPPORT SHAFT SUPPORT MEMBER
120 SERVOMOTOR
121 OUTPUT SHAFT
122 SERVOMOTOR ATTACHMENT MEMBER
125 DRIVE SHAFT
130 CORRECTION PLATE
131 DEVICE-SIDE CORRECTION PLATE
132 ATTACHMENT PORTION
133 HOUSING-UNIT-SIDE CORRECTION PLATE
140 PUMP UNIT
141 ATTACHMENT FLANGE
143 DRIVING MEANS SUPPORT PORTION
150 FLOW RATE ADJUSTMENT VALVE
151 FLOW PATH PORTION
152 OPENING
153 LIFTING VALVE
155 ADJUSTMENT OPENING
160 SERVO ACTUATOR
161 WORM JACK
162 LIFTING SHAFT
163 CONNECTION MEMBER
165 VALVE GUIDE
166 GUIDE ENGAGEMENT PORTION
170 TURBO MOLECULAR PUMP
171 PUMP FLANGE
173 CASING
174 STATIONARY BLADE
176 IMPELLER
177 SHAFT
178 ROTOR BLADE
180 VACUUM GAUGE
200 EXPERIMENTAL DEVICE
201 MAIN BODY
202 VACUUM FURNACE
205 BOTTOM PORTION
206 FLOW PATH PORTION
207 OPENING
210 PUMP UNIT
211 LIFTING VALVE
215 TURBO MOLECULAR PUMP
220 PRESSURE GAUGE

The invention claimed is:

1. A pump unit comprising:
a flow rate adjustment valve which includes
a flow path portion which has one end at which an opening is formed, and in which a fluid flows,
a lifting valve which is configured to cover an entire region of the opening to close the opening, be separated from the opening in an opening direction of the opening to open the opening, and change a distance from the opening in the opening direction to change a flow area with respect to the opening,
an actuator which generates a driving force to move the lifting valve in the opening direction based on a predetermined detection value,
a lifting shaft connected to the lifting valve, and
a jack that moves the lifting shaft in the opening direction by the driving force transmitted from the actuator;

a pump which is disposed opposite to the end portion where the opening is formed in the flow path portion, and sucks the fluid flowing in the flow path portion, and an attachment flange, wherein the lifting shaft extends through an outside of the flow path portion such that the lifting shaft does not touch the fluid flowing from the lifting valve to the pump, the attachment flange has a hole that penetrates in a thickness direction of the attachment flange, the hole forming a part of the flow path portion, the actuator and the jack being attached to the attachment flange.

2. The pump unit according to claim 1, wherein the lifting valve has a substantially circular shape when viewed in the opening direction, the pump includes an impeller rotating around a rotation axis and sucks the fluid flowing in the flow path portion by rotation of the impeller around the rotation axis, and the rotation axis of the pump substantially coincides with a central axis of the substantially circular shape which the lifting valve has.

3. The pump unit according to claim 1, wherein the actuator and the jack are attached to a surface of the attachment flange opposite to a surface of the attachment flange closer to the lifting valve.

4. The pump unit according to claim 1, wherein the lifting shaft penetrates the attachment flange at a position separate from the flow path portion.

5. The pump unit according to claim 1, further comprising:

a valve guide having a shape extending in the opening direction, and guides an opening/closing operation of the lifting valve; and a guide engagement portion attached to the lifting valve, extending in the opening direction, and engages with the valve guide.

6. The pump unit according to claim 5, wherein the lifting shaft and the valve guide arranged diametrically opposite around a center of the lifting valve.

* * * * *